United States Patent
Tang et al.

(10) Patent No.: US 6,791,583 B2
(45) Date of Patent: Sep. 14, 2004

(54) SYSTEM AND METHOD FOR PROVIDING SPATIALLY DISTRIBUTED DEVICE INTERACTION

(75) Inventors: John C. Tang, Palo Alto, CA (US); Nicole Y. Mordecai, Weston, MA (US); James M. A. Begole, Mountain View, CA (US); Francis C. Li, El Cerrito, CA (US); Max G. Van Kleek, Boise, ID (US); Janak R. Bhalodia, Indio, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 286 days.

(21) Appl. No.: 10/011,535

(22) Filed: Nov. 13, 2001

(65) Prior Publication Data

US 2002/0101446 A1 Aug. 1, 2002

Related U.S. Application Data

(63) Continuation-in-part of application No. 09/521,486, filed on Mar. 9, 2000, now Pat. No. 6,731,308.
(60) Provisional application No. 60/248,124, filed on Nov. 13, 2000.

(51) Int. Cl.$^7$ ................................................ G09G 5/00
(52) U.S. Cl. ...................................................... 345/751
(58) Field of Search ................................ 345/473, 474, 345/475, 751, 752, 753, 759

(56) References Cited

U.S. PATENT DOCUMENTS 6,430,604 B1 * 8/2002 Ogle et al. .................. 709/207
6,535,238 B1 * 3/2003 Kressin ..................... 348/14.01
6,654,790 B2 * 11/2003 Ogle et al. .................. 709/206
6,731,308 B1 * 5/2004 Tang et al. .................. 345/751

OTHER PUBLICATIONS

Sumi et al., "Supporting Awareness of Shared Interests and Experience in Community", SIGGROUP Bulletin, Dec. 2000, vol. 2 No. 3, pp. 35–42.*

Cadiz et al. "Designing and Deploying an Information Awareness interface" CSCW'02, Nov. 2002, ACM, pp. 314–323.*

* cited by examiner

Primary Examiner—Phu K. Nguyen
(74) Attorney, Agent, or Firm—Lahive & Cockfield, LLP

(57) ABSTRACT

In a plurality of electronic devices, a system and method is provided for providing interfaces on the plurality of electronic devices for interacting with at least one source of dynamically changing awareness information. Each of the plurality of electronic devices communicates with the at least one source to update the at least one source with individual awareness information for the electronic device in communication with the at least one source. Each of the plurality of electronic devices communicates with the at least one source to receive awareness information relating to others of the plurality of electronic devices. The awareness information can be a summary of electronic device statuses relating to a selected user. The awareness information can also include an indication of time since each of a plurality of electronic devices relating to a selected user has been in use. The awareness information can further include an indication of one or more of each of a plurality of electronic devices relating to a selected user being contemporaneously in use.

48 Claims, 24 Drawing Sheets

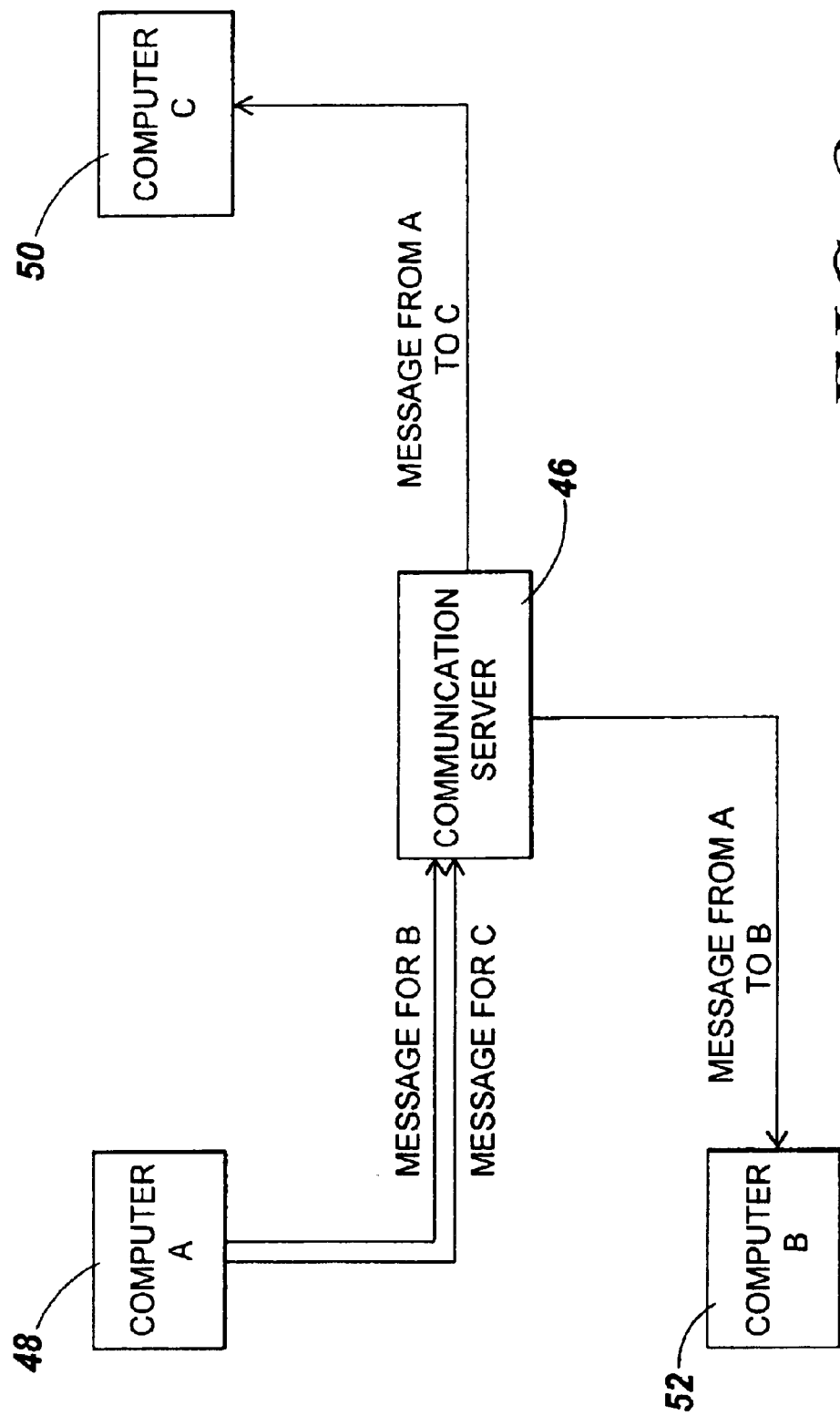

SYSTEM AND METHOD FOR PROVIDING SPATIALLY DISTRIBUTED DEVICE INTERACTION

RELATED APPLICATION

This application is a continuation-in-part of, and claims the benefit of, U.S. patent application Ser. No. 09/521,486, filed Mar. 9, 2000, now U.S. Pat. No. 6,731,308 which is expressly and entirely incorporated herein by reference. This application also claims the benefit of U.S. Provisional Application No. 60/248,124, filed Nov. 13, 2000, which is also expressly and entirely incorporated herein by reference.

FIELD OF THE INVENTION

The present invention relates to automated methods and systems for providing reciprocal information to two or more users of a set of spatially distributed data processing or electronic devices regarding each other's selected activities. More particularly, the present invention provides interfaces on a plurality of electronic devices, including mobile devices, for interacting with at least one source of dynamically changing awareness information.

BACKGROUND OF THE INVENTION

In the physical world, people employ a wide array of verbal and non-verbal cues to inform each other of their intentions to initiate a contact, e.g., start a conversation, or to terminate a contact, e.g., end a conversation. Further, in the physical world a person can assess another person's visual cues (e.g., facial expressions) or conditions (e.g., whether the person is engaged in a telephone conversation) to decide whether it is a proper time to initiate a contact with the other person. The availability of such reciprocal cues in the physical world allows a person to smoothly negotiate various interactions with other people.

People who work in close proximity of each other (such as the same building or site) employ reciprocal awareness of each other's activities to gauge whether to initiate a contact with a co-worker. For instance, a person working in an office may detect a co-worker approaching the office from a hallway and may be able to predict that the co-worker intends to initiate a conversation. Further, the person may be able to predict, based on prior familiarity with the co-worker and/or visual cues, the kind of conversation the co-worker intends to initiate. During the co-worker's approach, the person can react in various ways to indicate to the co-worker whether she is available for interaction. For example the person can turn her head toward the doorway to acknowledge the co-worker's approach, thereby inviting a conversation. Alternatively, the person can intensify her focus on her current task, to dissuade the co-worker from interrupting her.

Likewise, the co-worker can choose a course of conduct based on visual cues that he receives from the person that he intends to contact. For example, if the person is engaged in a telephone conversation, or if the person has a visitor in her office, the co-worker may decide that it is not an opportune time to make the contact. Further, such reciprocal awareness between the parties allows them to negotiate access and control privacy. For instance, a person can provide a signal (such as closing the office door) to a co-worker who is standing outside her office and monitoring her activity to indicate that she is aware of the co-worker's presence, and wishes the co-worker to leave. Additionally, a person who is aware of being monitored by a co-worker can control the information that the co-worker receives.

A similar process occurs when two parties intend to terminate an interaction. In particular, parties tend to give each other mutually shared non-verbal indications of an intent to end a conversation. For example, as a conversation begins to wind down, one of the parties may glance at her watch, take steps toward a doorway, or provide other cues of her intention to terminate the conversation. Further, after the termination of the conversation, one or both of the parties can restart the conversation, for example to convey a last-minute thought without much effort.

Among distributed participants (i.e., remotely situated) in a conversation, however, there is no reciprocal awareness of any participant's non-verbal cues of an intent to start and/or end an interaction. Thus, such distributed participants need to develop explicit, formal mechanisms for initiating and/or ending a contact. For example, before engaging in a telephone conversation, the telephone must first ring to provide an explicit indication of one party's intent to initiate a contact, and the receiving party must explicitly answer the phone. In addition, there is generally some explicit exchange of identities (e.g. "Hi, this is Bob"). Similarly, the parties typically exchange an explicit "goodbye" before hanging up the telephone, thereby terminating the telephone conversation.

Similarly, the interactions among distributed users of an interconnected set of computers can lack visual cues regarding each participant's intention to begin and/or to end an interaction. For example, in current instant messenger (IM) systems, an initiating user can initiate an IM contact with a receiver by popping up a window on the receiver's computer. The receiver, however, has no awareness that a contact from the initiating user is imminent, and reciprocally, the initiating user has no knowledge of whether the receiver is attending to the IM. For example, the initiator does not know whether a lack of response from the receiver is because the receiver is in the process of composing an answer or because the receiver is ignoring the IM.

Similarly, ending a contact in current IM systems tends to be awkward and can result in a premature disconnection of the communication link between the parties. For example, in some IM systems, one user can close an IM window to end a conversation without the other user knowing that the IM window has been closed. Thus, IM conversations in such systems require an explicit exchange of farewells before termination.

A number of systems that attempt to address the shortcomings of IM systems are known. For example, one system provides each computer of a set of users with a digital camera. A user of the system obtains periodic snap-shots of the offices of selected participants from the digital cameras. Thus, the user has a matrix of snap-shots composed of the images from the offices of the selected participants. This matrix of snap-shots allows the user to decide whether to initiate a contact with another participant. Such a system, however, has privacy issues, and further such a system requires that each participant have a digital camera and ancillary equipment.

Another system, known as "Gallery", is described in U.S. Pat. No. 5,793,365. Gallery provides each user with iconic pictures of other users. Each iconic picture can represent three different states: a first indicating that the user is actively working on the computer, a second indicating that the computer keyboard has been idle more than a few minutes, and a third indicating that the person is engaged in a computer-mediated communication, such as a desk-top video conference. Gallery provides only three distinguishable states of each user to the other users. Further, Gallery requires that three distinct iconic images of each user be created and stored.

A research project known as "Peepholes", which is described in a paper entitled "Low Cost Awareness of One's Community," published in ACM SIGCHI '96 Proceedings of Conference on Human Factors in Computing Systems (1996), offers a similar functionality to that offered by Gallery. "Peepholes" provides line drawings of each user rather than an iconic image. Further, Peepholes provides more than three states for indicating the activity of a user. One disadvantage of Peepholes is that the representations of the users occupy a large portion of a user's computer screen which is traditionally viewed as valuable real estate that users are reluctant to give up. In addition, Peepholes uses a name label to associate a line drawing with that user, further aggravating the crowding of the user's computer screen.

Some researchers have suggested employing physical objects to which sensors are attached to be interfaced with computers of distributed users to provide mutual awareness among the users. For example, one research approach employs a first doll to represent a user and a second doll to represent a co-worker of the user. The user may turn the first doll representing herself toward the second doll representing the co-worker to indicate her intention to contact the co-worker. The user's computer detects the juxtaposition of the dolls and sends a signal to the co-worker's computer to inform the co-worker of the user's intention to make contact. Such a system requires explicit action by a user to convey an intention to communicate with another user. Further, such a system requires specialized peripherals, such as sensors and computer-controlled objects, to be interfaced with each user's computer.

SUMMARY OF THE INVENTION

For purposes of clarification in the discussion below, it is helpful to clarify the meaning of certain terms. A communication link, as used herein, refers to a connection between at least two parties that allows each party to transmit information to the other party. A communication link is used to establish a communication session, which is more formally defined below. Once a communication link has been established and a request for interaction among at least two parties has been accepted, a communication session is established. A communication link can be provided by a physical connection, for example by employing wire, optical fiber, etc. Alternatively, a communication link can be provided by wireless techniques. Further, a communication link employed with the present invention is not limited to the use of any particular protocol. For example, various network protocols (e.g., token ring) for linking two or more computers can be employed.

A communication session, as used herein, is established between at least two parties when a party requests establishing a communication session with another party by initiating a communication link and the other party accepts the request and actively attends to the information received from the initiating party through the established communication link. With a communication session, there is mutual engagement of the parties and there is interactivity among the parties.

The present invention provides a method for providing information to an initiator regarding availability of an intended recipient for engaging in a communication session. The method is especially well-adapted for use with instant messaging. In particular, in one embodiment of the present invention, the initiator is provided with a visual representation of the intended recipient. The visual representation conveys information regarding the availability of the intended recipient. The visual representation can be a handle, such as a textual handle, a graphical handle, or a combination thereof. For example, the visual representation can inform the initiator that the recipient is engaged in a telephone conversation and hence provide a cue that the recipient is not available for engaging in an instant messaging session.

Upon the initiator's request, additional information regarding the availability of the intended recipient may be provided to the initiator. For example, a user interface element may be provided to the initiator when the initiator selects the visual representation of the intended recipient. The user interface element provides additional information regarding the availability of the intended recipient to engage in an instant messaging communication session. The additional information can include, but is not limited to, the number of unread electronic messages that the initiator has received from the intended recipient, the number of voice mail messages from the intended recipient to which the initiator has not listened, and the appointment schedule of the intended recipient. The user interface element can optionally include a communication interface to allow the initiator to establish a communication link with the intended recipient. Such a communication interface, for example, can provide an instant messaging link, a telephone link, or an e-mail link between the initiator and the intended recipient.

The present invention not only allows an initiator to access information regarding the availability of an intended recipient to participate in a communication session, as discussed above, but it also informs the intended recipient that the initiator is accessing such information. Accordingly, another aspect of the invention relates to a method for informing an intended recipient that an initiator is accessing selected information regarding the intended recipient. The method includes the step of providing the intended recipient with a visual representation of the initiator and includes the additional step of presenting a user interface element associated with the representation of the initiator to the intended recipient when the initiator initiates accessing selected information regarding the intended recipient.

Upon reviewing the information regarding availability of an intended recipient, an initiator may initiate the establishment of a communication link with the intended recipient. By initiating a communication link, the initiator illustrates its desire to participate in a communication session with the intended recipient. One aspect of the invention relates to informing the intended recipient that the initiator has initiated establishing the communication link. In particular, this aspect of the invention provides a method for providing information to the intended recipient regarding the initiator's intention to establish a communication session. The method includes the step of providing the intended recipient with a visual representation of the initiator, and further includes the step of presenting a user interface element to the intended recipient associated with the representation of the initiator when the initiator initiates establishing a communication link with the intended recipient. The user interface element informs the intended recipient of the initiator's intention to establish a communication session.

Upon being informed of the initiator's request for establishing a communication session, the intended recipient can accept the request, ignore the request, or request additional information regarding the initiator's intended message. If the intended recipient requests such additional information, the method of the invention provides the intended recipient with a user interface element, such as a contact preview window on a computer desktop, that provides information regarding the message that the initiator intends to transmit. For example, in a computer environment, the contact preview window can include at least a portion of an intended message, to allow the intended recipient to decide whether to accept or to ignore the initiator's request.

A communication session is established only after the intended recipient accepts a request by the initiator. In one embodiment of the present invention, each party is informed whether an active communication session is established between the parties and are interactively engaged in communicating with each other. In particular, a signal indicating whether a communication session with the intended recipient is established is sent to the initiator. The signal can be visual, audio, or a combination thereof. Those skilled in the art will appreciate that other types of signals can also be employed. For example, the vibrations of an object can provide the requisite signal.

In a plurality of electronic devices, a method is provided in accordance with the teachings of the present invention for providing interfaces on the plurality of electronic devices for interacting with at least one source of dynamically changing awareness information. Each of the plurality of electronic devices communicates with the source to update the source with individual awareness information for the electronic device in communication with the source. Each of the plurality of electronic devices also communicates with the source to receive awareness information relating to others of the plurality of electronic devices.

The plurality of electronic devices can periodically communicate with the source to update the at least one source with individual awareness information, and the electronic devices can periodically communicate with the source to receive awareness information. The source can initiate the communication with each of the electronic devices, or each of the electronic devices can initiate the communication with the source.

The awareness information can be a summary of electronic device statuses relating to a selected user. The awareness information can also include an indication of time since each of a plurality of electronic devices relating to a selected user has been in use. The awareness information can further include an indication of one or more of each of a plurality of electronic devices relating to a selected user being contemporaneously in use.

One of the plurality of electronic devices can provide an indication of a location of a selected user based at least in part on the awareness information. Alternatively, a user can identify the location of another selected user based on the awareness information provided to at least on of the electronic devices.

The at least one source can be a centralized data processing system or a telephone dialer system.

The step of communicating to update the at least one source and the step of communicating to receive awareness information can occur during a same communication transaction. The communication can include the transmission of at least one of data and voice.

In accordance with another embodiment of the present invention, in a first electronic device, a method is provided for providing one or more interfaces with a second electronic device for interacting with at least one source of dynamically changing awareness information. The second electronic device communicates with the at least one source to update the at least one source with individual awareness information for the second electronic device. The second electronic device communicates with the at least one source to receive awareness information relating to a third electronic device.

In accordance with yet another embodiment of the present invention, in a user mobile device, a method for interfacing with a central electronic device is provided. The method includes establishing communication with the central electronic device. The central electronic device is updated with individual awareness information for the user mobile device. Awareness information is received relating to at least an additional electronic device.

In accordance with a further embodiment of the present invention, in an electronic device in communication with at least one source, a method is provided of an initiating user interacting with a selected user. Communication occurs with the source to receive awareness information relating to the selected user and at least one corresponding selected user device. An attempt to initiate a communication with the selected user is executed based at least partially on the awareness information relating to the selected user.

The step of attempting to initiate a communication can include the initiating user selecting an icon representing a selected form of communication. The corresponding selected user device can indicate to the selected user a willingness to communicate of the initiating user. The selected user can respond with an indication of one of a willingness to communicate and an unwillingness to communicate with the initiating user. The indication of a willingness to communicate can be in the form of the selected user clicking on a button to join an IM chat session. The indication of an unwillingness to communicate can be in the form of the selected user clicking on a button to reply to the initiating user at a later time. The selected user can participate in a communication session with the initiating user. At least one of the selected user and the initiating user can indicate a desire to terminate the communication session. The selected user and the initiating user can then be provided with an opportunity for one or more of the selected user and the initiating user to submit a last-minute thought prior to termination of the communication session.

The initiating user can obtain a status of the selected user and the corresponding selected user device based at least partially on the awareness information. The selected user will receive notification of the initiating user obtaining the status of the selected user and the corresponding selected user device. The electronic device can be one of a data processing device and a telephonic device.

In accordance with still another embodiment of the present invention, in an electronic device in communication with at least one source, a method is provided of an initiating user interacting with a selected user. Communication occurs with the source to receive awareness information relating to the selected user. An attempt is made to locate the selected user based at least partially on the awareness information relating to the selected user.

The step of attempting to locate the selected user can include the electronic device executing an algorithm to provide an indication of the selected user location based at least partially on the awareness information. Alternatively, the initiating user can review awareness information provided to the electronic device to determine the selected user location.

In accordance with a further aspect of the present invention, a system for providing awareness information to one or more users includes a central data processing apparatus for managing the awareness information, and at least one spatially distributed electronic device in communication with the central data processing apparatus. The central data processing apparatus receives updates relating to awareness information concerning a status of the spatially distributed electronic device, and the spatially distributed electronic device receives updates relating to additional awareness information relating to one or more selected users.

The central data processing apparatus can include a computer server and a telephone dialer server. The computer server can have one or more communication means. The one or more communication means can be, but is not limited to, at least one of a modem, cable modem, network interface, telephone interface, infra-red interface, RF interface, audio interface, visual display, wired connection, and wireless connection.

The central processing apparatus can further include a proxy to the computer server enabling communication with a spatially distributed electronic device. In addition, a transcoder can be provided for translating messages between the proxy and a pager network.

The at least one spatially distributed electronic device can be at least one of a computer workstation, notebook computer, personal digital assistant, information appliance, pager, telephone, mobile phone, communication appliance, and data processing device.

BRIEF DESCRIPTION OF THE DRAWINGS

The aforementioned features and advantages, and other features and aspects of the present invention, will become better understood with regard to the following description and accompanying drawings, wherein:

FIG. 2 illustrates an alternative computer system having a centralized architecture for implementing the method of the invention;

DETAILED DESCRIPTION

An illustrative embodiment, consistent with the principles of the present invention, relates to method and system for providing reciprocal information to two or more parties regarding activities of each other. The parties can establish a communication session, such as an instant messaging session, with each other. The present invention allows each party to obtain information regarding selected activities of another party. For example, information may be provided to determine an opportune time to initiate establishing a communication session, such as an instant messaging session, with the other party.

The present invention can be implemented in a peer to peer environment, where a module implementing the method of the present invention runs on each peer. Alternatively, the present invention can be implemented in an environment having a centralized distribution architecture, as discussed below. Alternatively, a hybrid structure employing aspects of the peer to peer environment and the centralized architecture can be employed.

The present invention is further directed to an awareness information system that can be implemented in a spatially distributed environment and amongst multiple platforms and protocols. Some of the devices that users employ may be mobile devices. A user can maintain access to the awareness information system through one or more electronic devices, such as computer, personal digital assistant (PDA), pager, mobile phone, and the like. Access provides the user with information concerning the activities of other selected users relative to their electronic device or devices. The awareness information allows the user to locate other selected users, initiate communications, and terminate communications in a manner more reflective of typical and direct human interaction.

Figure 1:
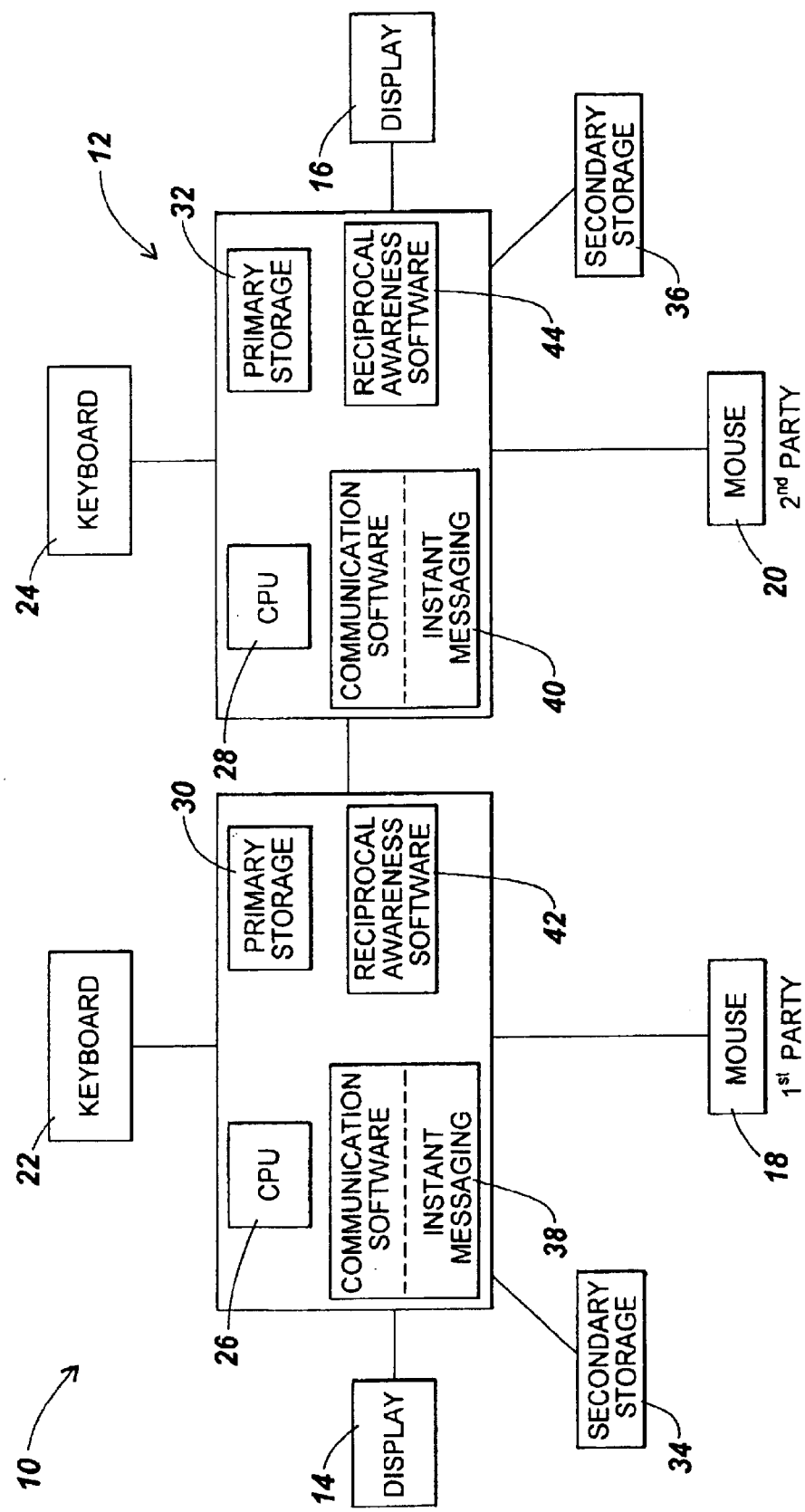
FIG. 1 illustrates a computer system for implementing a method of an illustrative embodiment of the present invention in a peer to peer environment.

FIG. 1 illustrates a suitable environment for practicing the illustrative embodiment. A computer system 10, controlled by a first party, interacts with a computer system 12, controlled by a second party, who may be located at a remote geographic location from the first party. The computer systems 10 and 12 include respective display devices 14 and 16. In addition, the computer systems 10 and 12 include respective input/output devices, such as mice 18 and 20, and keyboards 22 and 24. Further, the computer systems 10 and 12 include central processing units (CPU) 26 and 28 for executing instructions. The computer systems 10 and 12 also include primary storage media, such as random access memory (RAM), 30, and 32, and secondary storage media, such as hard disks 34 and 36.

The computer systems 10 and 12 include communication softwares 38 and 40 for establishing a communication link therebetween. For example, the communication softwares 38 and 40 can be selected to establish an instant messaging communication between the computers 10 and 12. Further, the computer 10 and 12 have software modules 42 and 44, herein referred to as "reciprocal awareness software," that implement the method of the invention.

Those skilled in the art will appreciate that the depiction of the environment in FIG. 1 is intended to be merely illustrative and not limiting of the present invention. Additional interconnected computers and parties can be employed in practicing the invention. The depiction of two computer systems 10 and 12 is intended to depict a simple case without any loss of generality.

FIG. 2 illustrates an alternative environment for practicing the method of the invention, where a centralized architecture is used. In this alternative environment, a communication server 46, such as an instant messaging server, provides a communication link among a plurality of computers, such as computers 48, 50, and 52. The server 46 receives messages from each computer and transmits the received messages to the intended recipients. Further, the server 46 can include at least a portion of a software module that implements the method of the invention.

Figure 3A:
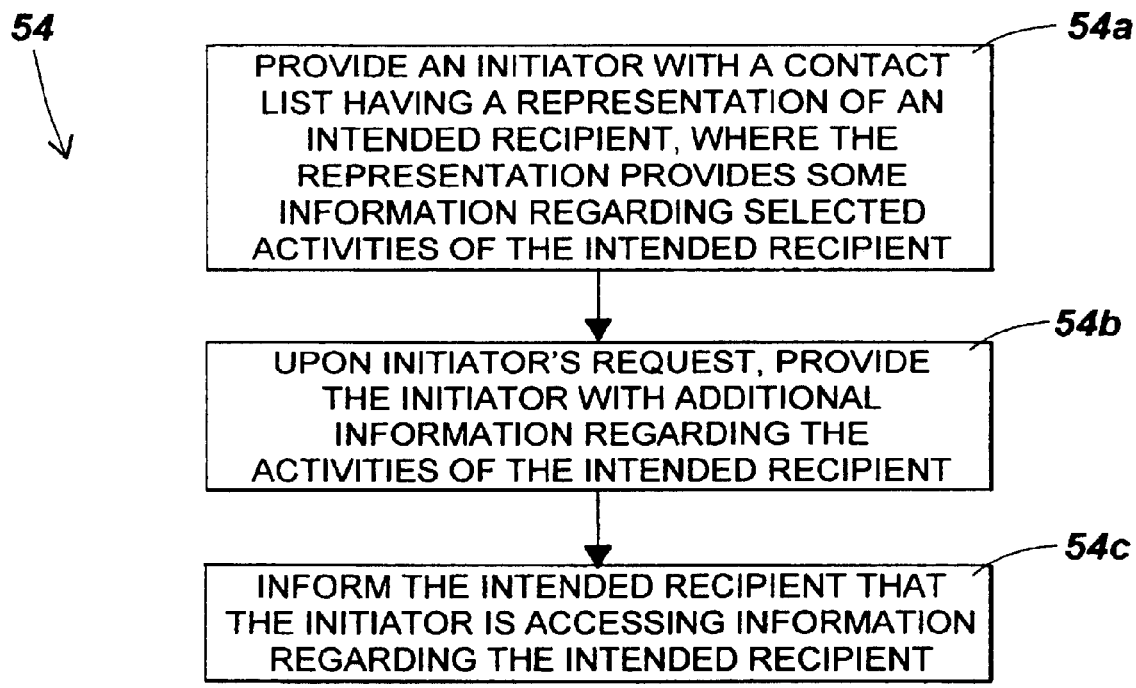
FIG. 3A is a flow chart depicting the various steps of an illustrative embodiment for practicing one aspect of the present invention.

FIG. 3A illustrates a flow chart 54 depicting the various steps of an illustrative embodiment of one aspect of the method of the invention for providing at least two parties with reciprocal information regarding each other's activities. The method provides a contact list in step 54a for each party that includes a representation of the other party. The contact list also includes information regarding selected activities of the other party. Such information can include, but is not limited to, whether the other party is engaged in a telephone conversation, engaged in an instant messaging session, etc. This information is periodically updated to provide each party with current information regarding the other party's availability for engaging in a communication session.

If one party, herein referred to as the initiator, requests additional information regarding the other party, herein referred to as the intended recipient, the illustrative embodiment in step 54b provides such additional information to the initiator. This additional information further assists the initiator in deciding whether it is an opportune time for engaging in a communication session, such as an instant messaging session, with the intended recipient.

In step 54c, the intended recipient is informed that the initiator is accessing information regarding the intended recipient, thereby providing the parties with reciprocal awareness of each other's actions.

Figure 3B:
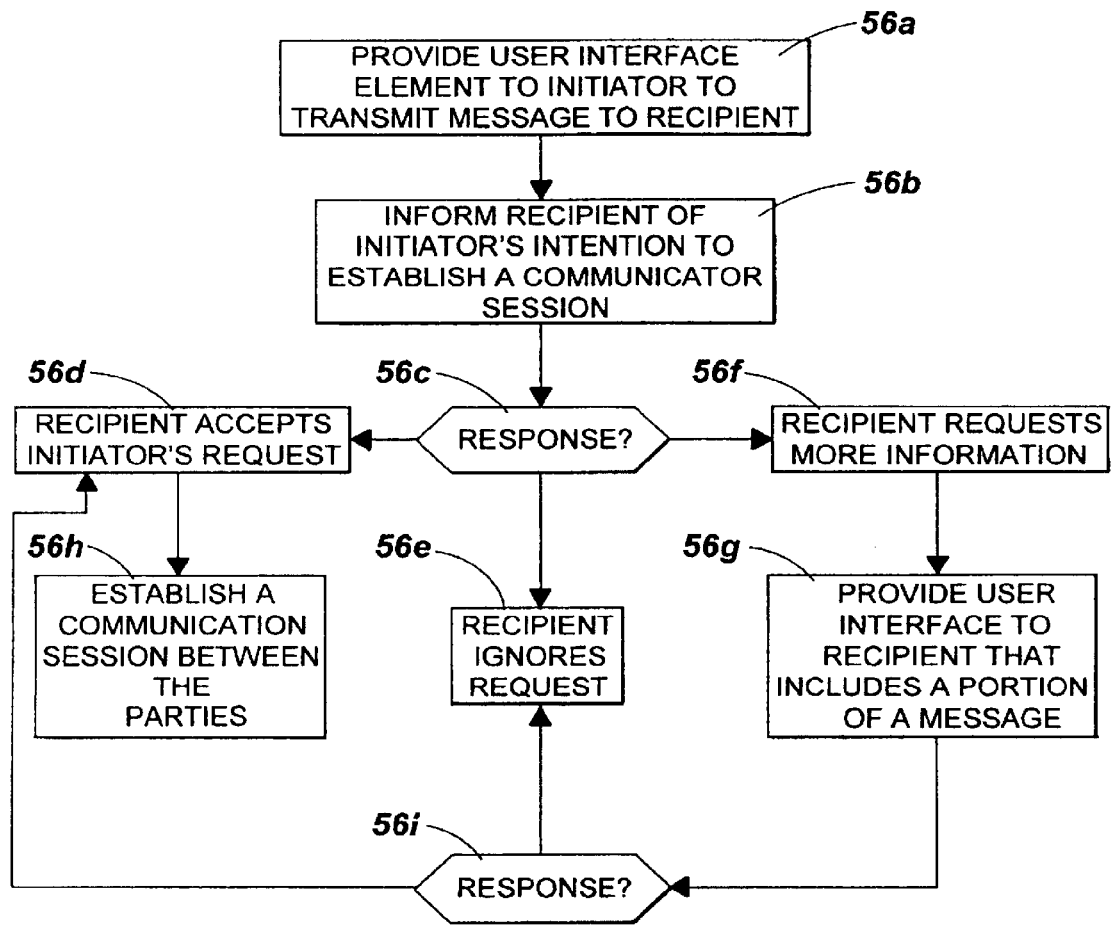
FIG. 3B is another flow chart depicting the various steps of an illustrative embodiment for practicing another aspect of the present invention.

FIG. 3B is a flow chart 56 depicting the various steps of another embodiment of the invention. In this alternative embodiment, in step 56a, upon an initiator's initiation to establish a communication session with an intended recipient, a user interface element is provided to the initiator to allow the initiator to transmit a message to the intended recipient. In step 56b, the intended recipient is informed of the initiator's intention to establish a communication session. The intended recipient may respond in multiple ways (see step 56c). The intended recipient can either accept the initiator's invitation (step 56d), ignore the invitation (step 56e), or request more information (step 56f). If the intended recipient accepts the invitation, a communication session is established between the parties, as shown in step 56h. If the intended recipient requests to have more information about the initiator's invitation (step 56f), a user interface element is provided to the intended recipient (step 56g). The user interface element presents at least a portion of a message that the initiator intends to transmit. Upon reviewing this information, the intended recipient can respond (step 56i) by either accepting the initiator's invitation (step 56d), or ignore the invitation (step 56e). If the intended recipient accepts the initiator's invitation, a communication session is established between the initiator and the intended recipient, as shown in step 56h.

Without any loss of generality, an example of operation of the illustrative embodiment will be described below by referring to two parties, herein named Janak and John, who can communicate with each other by utilizing, for example, the computers 10 and 12 (FIG. 1), respectively. Again without any loss of generality, in the following illustrative embodiment, John is selected to be the initiator, and Janak is selected to be the intended recipient.

Figure 4A:
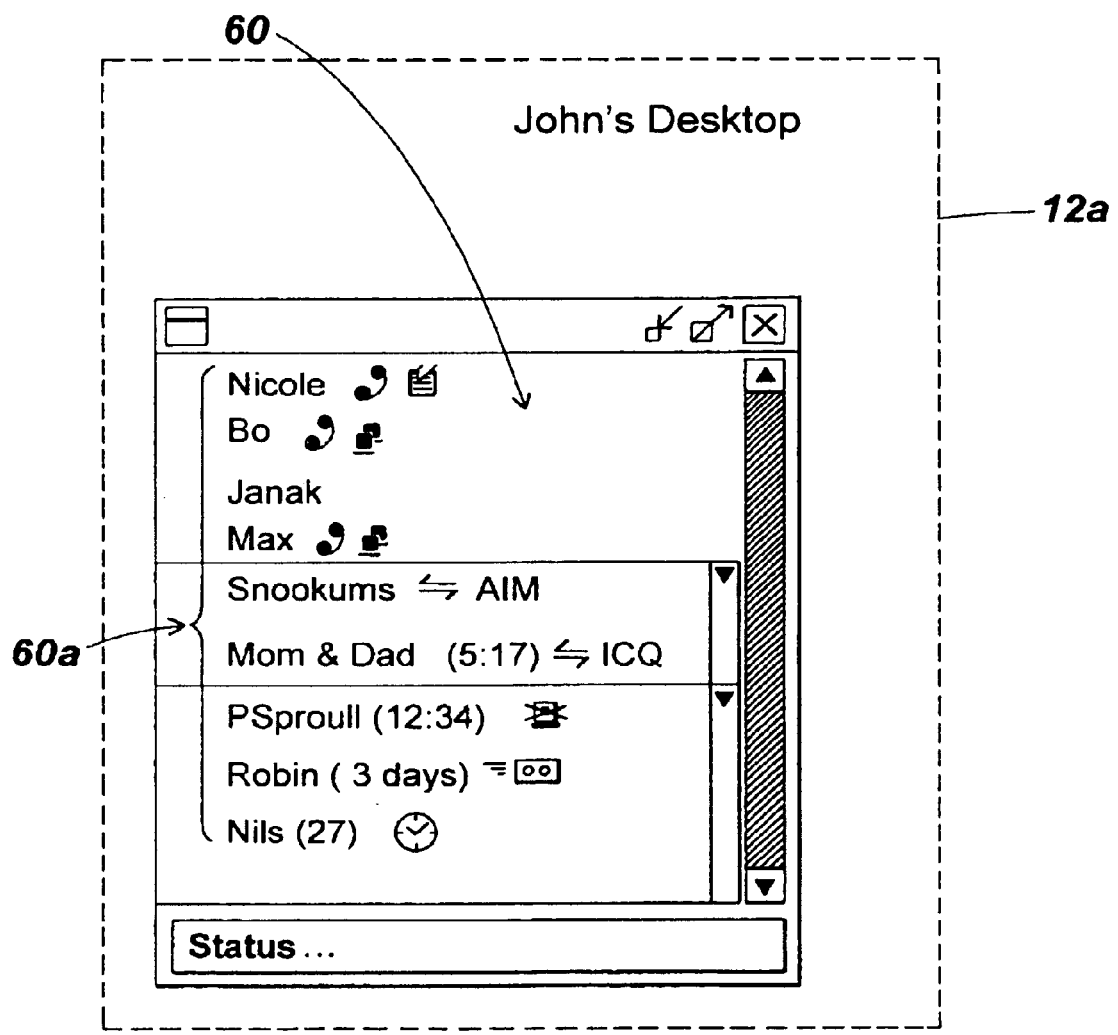
FIG. 4A schematically illustrates the computer desktop of the initiator, where the desktop includes a display window containing a contact list.
Figure 4B:
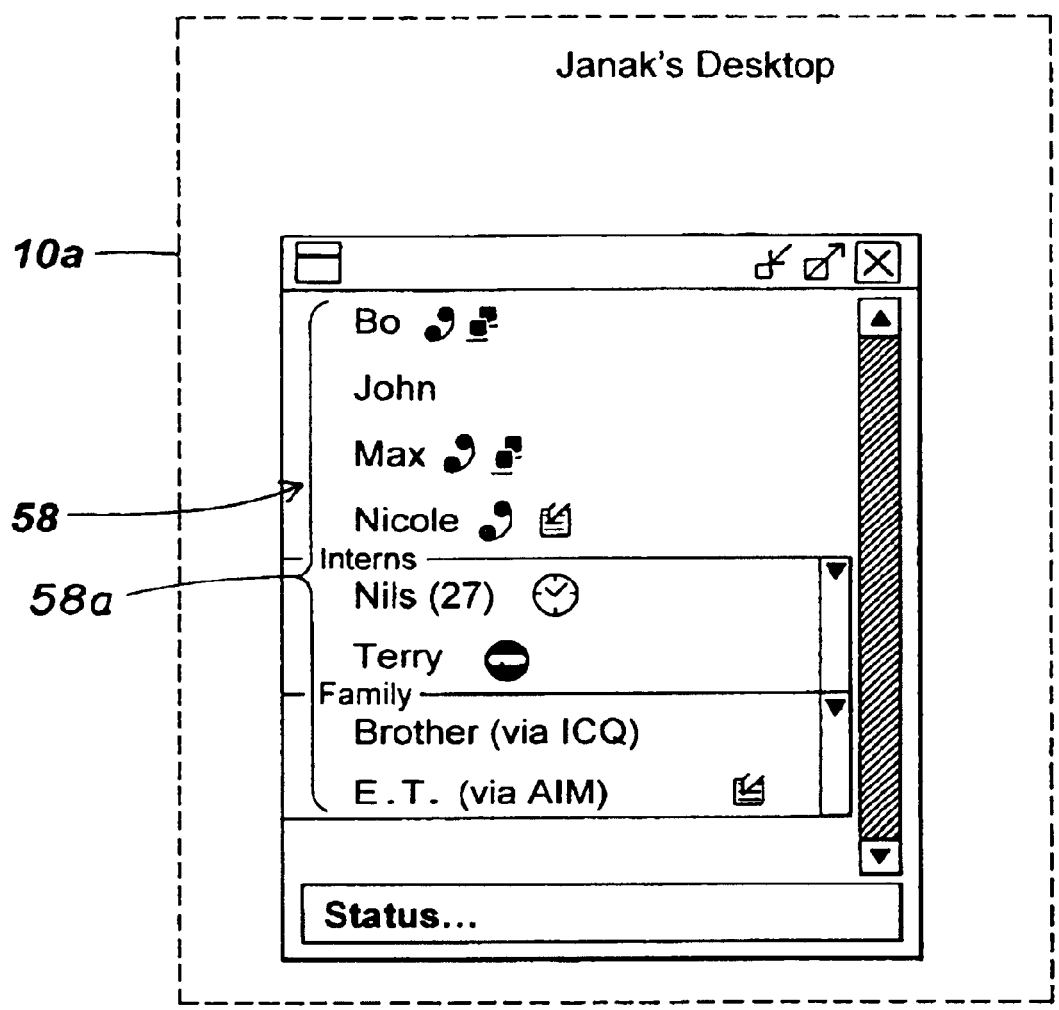
FIG. 4B schematically illustrates the computer desktop of the intended recipient who participates in a communication session with other parties listed in a contact list within a display window on the computer desktop.

FIG. 4A shows that John's desktop 12a includes a display window 60 containing John's contact list 60a with Janak's name. FIG. 4B illustrates Janak's computer video display 10a. The display is a 'desktop' that includes a display window 58 with Janak's contact list 58a. The contact list 58a includes visual representations of the parties. The contact list includes John, with whom Janak can establish a communication link. Each visual representation can include a handle depicting one of the parties. The handle can be either textual, graphical or a combination thereof. In this illustrative example, Janak's contact list 58a includes John's name as a textual handle for representing John. Those skilled in the art will appreciate that many different visual representations can be employed in practicing the present invention. For example, a graphical handle, a textual handle, or a hybrid thereof can be employed to represent each party in a contact list.

Figure 5A:
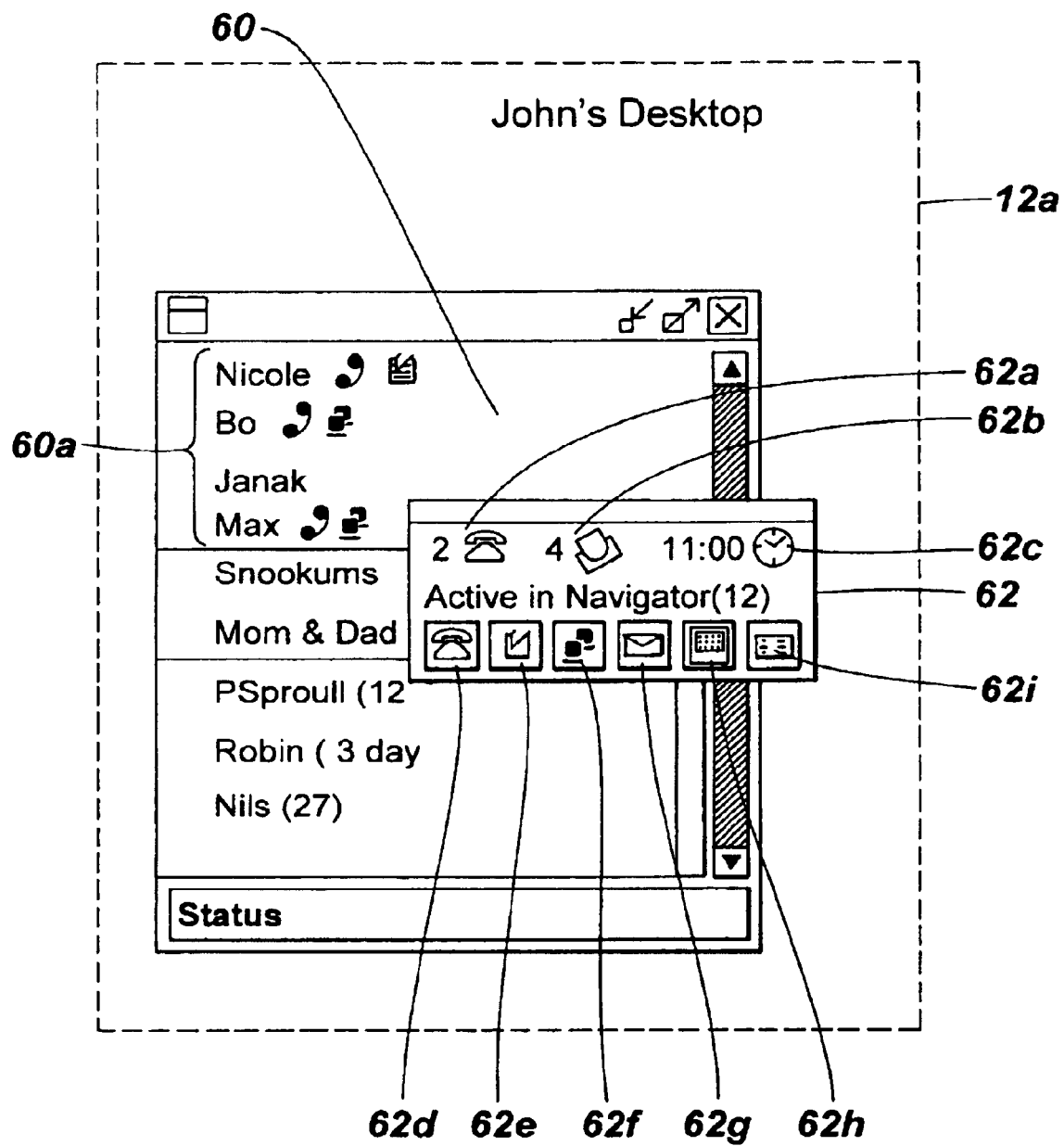
FIG. 5A illustrates the display window of FIG. 4A and further illustrates an information window presented to an initiator upon the initiator's request to obtain additional information regarding selected activities of an intended recipient.

The illustrative embodiment allows both John and Janak to obtain information regarding the availability of the other party to participate in a communication session, such as an instant messaging session. As shown in FIG. 5A, John can obtain additional information about Janak's selected activities by selecting the visual representation of Janak (i.e., Janak's name) in John's contact list 60a. For example, John can select Janak's entry in the contact list 60a through a point and click operation. Upon John's selection of Janak's entry, an information window 62 appears on John's desktop 12a. The information window 62 includes selected information about Janak's activities. In particular, the illustrative information window 62 includes a telephone icon 62a, an envelope icon 62b, and a clock icon 62c. The telephone icon 62a indicates that John has two voice mail messages from Janak to which he has not listened. The envelope icon 62b indicates that John has four unread e-mail messages from Janak. Further, a message next to the clock icon can be provided to inform John of Janak's appointments for the day. Further, the illustrative information window 62 informs John that Janak has been active in the Navigator Web Browser for the last twelve minutes.

The information regarding Janak's selected activities in the visual representation indicates to John whether Janak is likely to be available to participate in a communication session with John. In particular, John can utilize the information provided in the information window 62 to decide whether it is an appropriate time to contact Janak. For example, John may decide that he should first listen to the voice mails from Janak and/or read the unread e-mail messages from Janak before initiating a contact. If John decides to initiate a contact with Janak, he can choose one of the communication options provided in the information window 62 to initiate such a contact. The illustrative information window 62 presents John with a number of communication options, represented by icons 62d, 62e, 62f, and 62g. For example, John can initiate establishing a telephone link with Janak by simply clicking once on the icon 62d, or initiate establishing an instant messaging link by clicking once on the icon 62e. Alternatively, John can establish a data conferencing session with Janak by selecting the icon 62f. John may instead of initiating a synchronous communication decide to initiate an asynchronous communication. For example, he may decide to send Janak an electronic mail (email) rather than place a call to Janak because, for example, the information provided in the window 62 indicates that Janak is attending a meeting. In such a case, John can click on the icon 62g to send an email to Janak.

In addition, the illustrative embodiment allows John to launch a default communication option, such as an IM link, by double-clicking on Janak's name in the display window 60. Further, John can select an icon 62h to obtain information regarding Janak's scheduled appointments, and can select an icon 62i to access Janak's electronic business card.

Figure 5B:
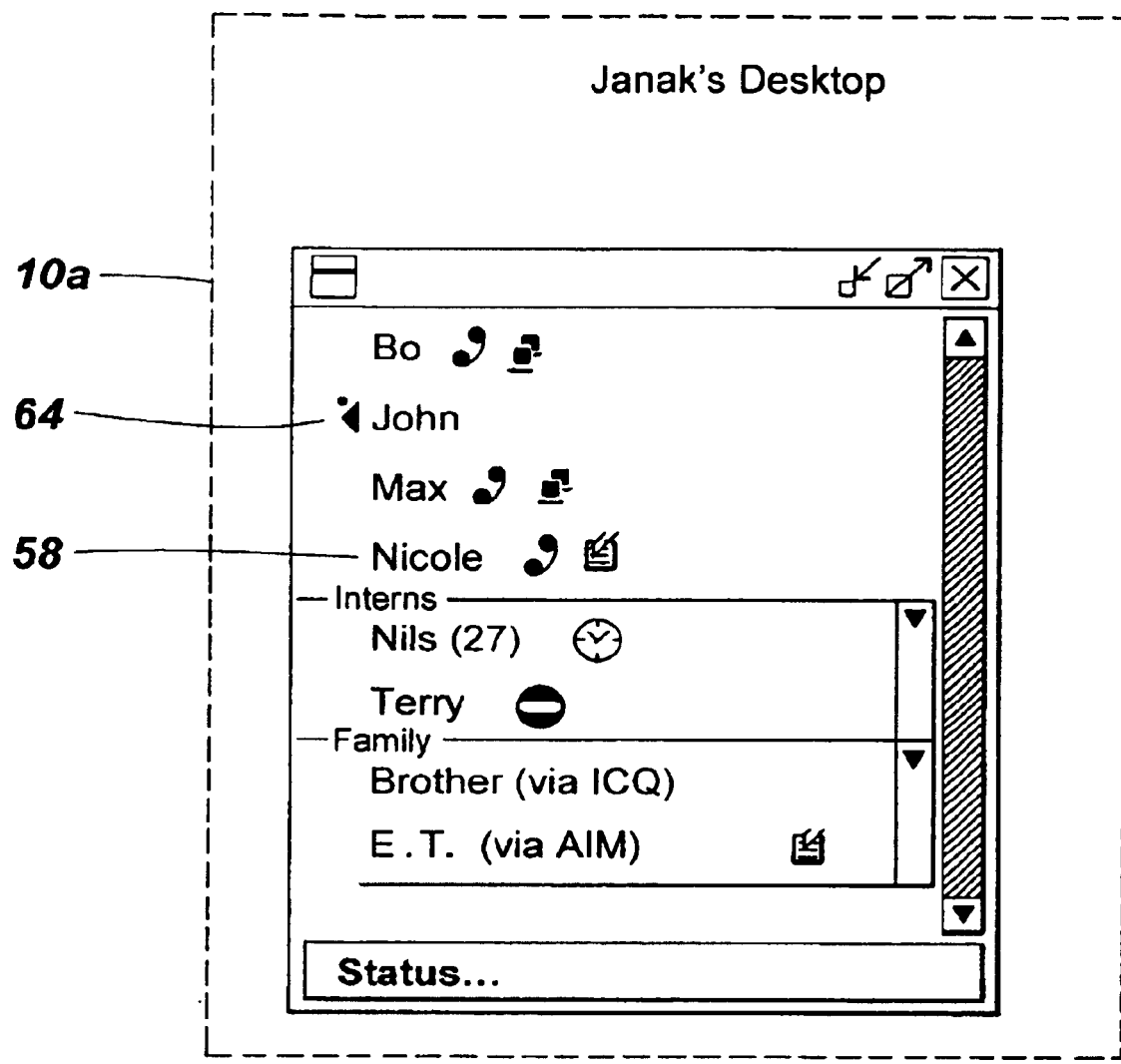
FIG. 5B illustrates the display window of the intended recipient and further illustrates an animated icon associated with the visual representation of an initiator to inform the intended recipient of the initiator's access to information regarding selected activities of the intended recipient.

Upon John's accessing information about Janak's activities, the illustrative embodiment provides a user interface element in Janak's display window 58 to inform Janak that John is viewing selected information about Janak. The user interface element can be visual, audio, or a combination thereof. With reference to FIG. 5B, the illustrative embodiment presents an animated icon 64 associated with John's name in Janak's display window 58 to inform Janak that John is viewing information regarding Janak's activities. Thus, while John is viewing selected information regarding Janak's activities, Janak is reciprocally aware of John's action. Janak's awareness of John's action, i.e., John's access to information regarding selected activities of Janak, has a number of advantages. In particular, it provides safeguards against a party abusing the ability to obtain information regarding another party's activities. These safeguards are similar to those present when people are physically co-located. For example, in a physically co-located environment, a person's awareness that a co-worker is lurking outside her office discourages the co-worker from engaging in such a behavior. Similarly, in the illustrative system, Janak's awareness that John is viewing information about Janak's activities discourages John from unduly monitoring Janak's activities. In addition, the information provided to Janak also tells Janak that John is about to contact her. Janak may also be provided with a preview of an impending communication.

Figure 6A:
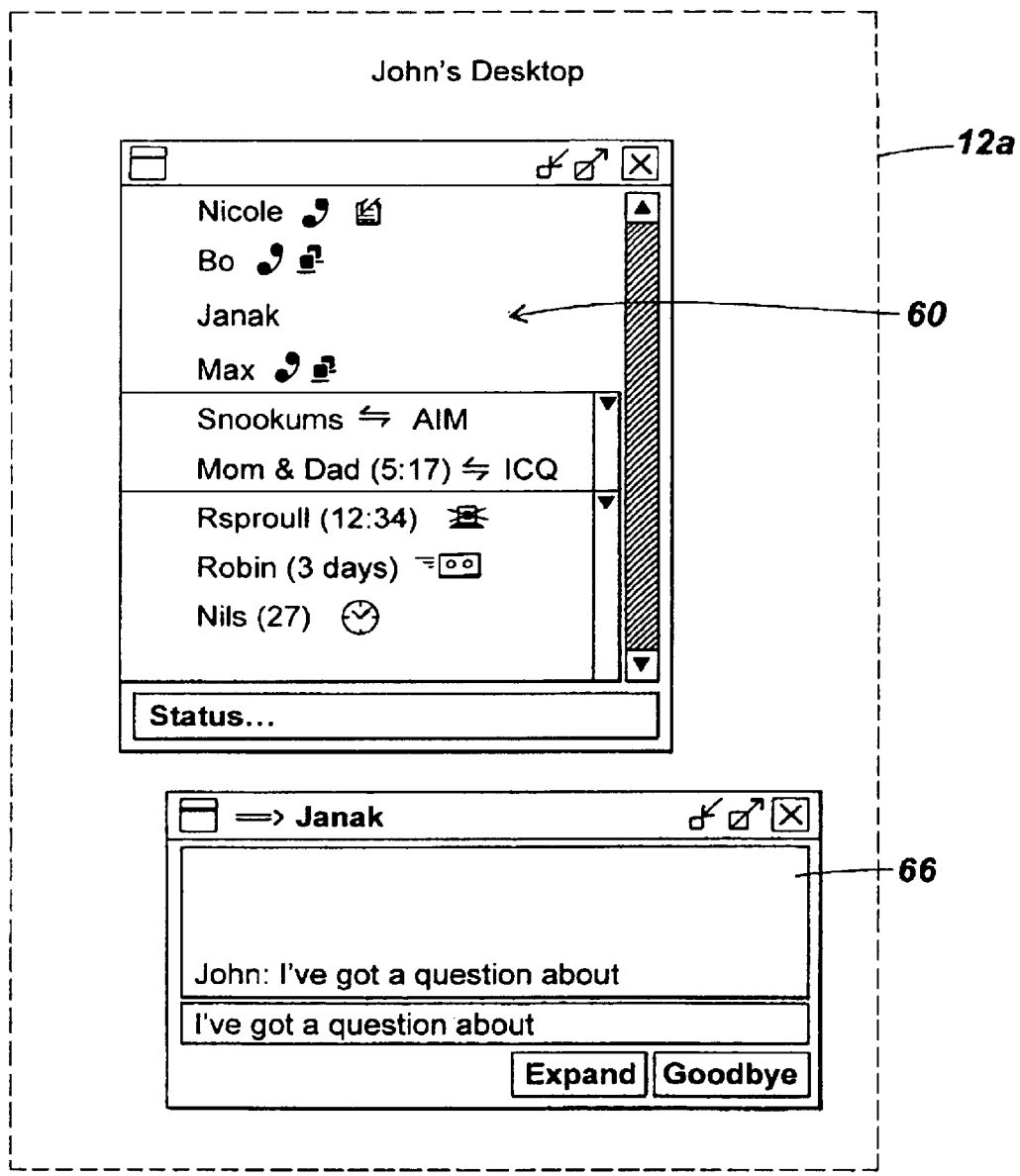
FIG. 6A illustrates the display window of an initiator and further illustrates a message window presented to the initiator upon initiation of establishing a communication link with an intended recipient.

With reference to FIG. 6A, after viewing the information regarding Janak's activities, John may decide that it is an opportune time to initiate establishing an IM communication link with Janak. John can initiate establishing an IM link with Janak, for example, by double clicking on Janak's name in the display window 60. Upon John's initiation of a communication link with Janak, a message window 66 appears on John's desktop 12a in which John can provide a textual message to be transmitted to Janak.

A mutual communication session is, however, established only after Janak accepts John's request for engaging in a communication with John. The illustrative embodiment presents John with a visual signal that indicates whether a communication session with Janak has been established, i.e., whether Janak has accepted John's request for establishing a communication session. In particular, the gray background color of John's message window 66 (FIG. 6A) indicates that a communication session between John and Janak has not been yet established. Those skilled in the art will understand that other signals, either visual or audio, or both, can be employed to inform a party whether a communication session with another party has been established.

Figure 6B:
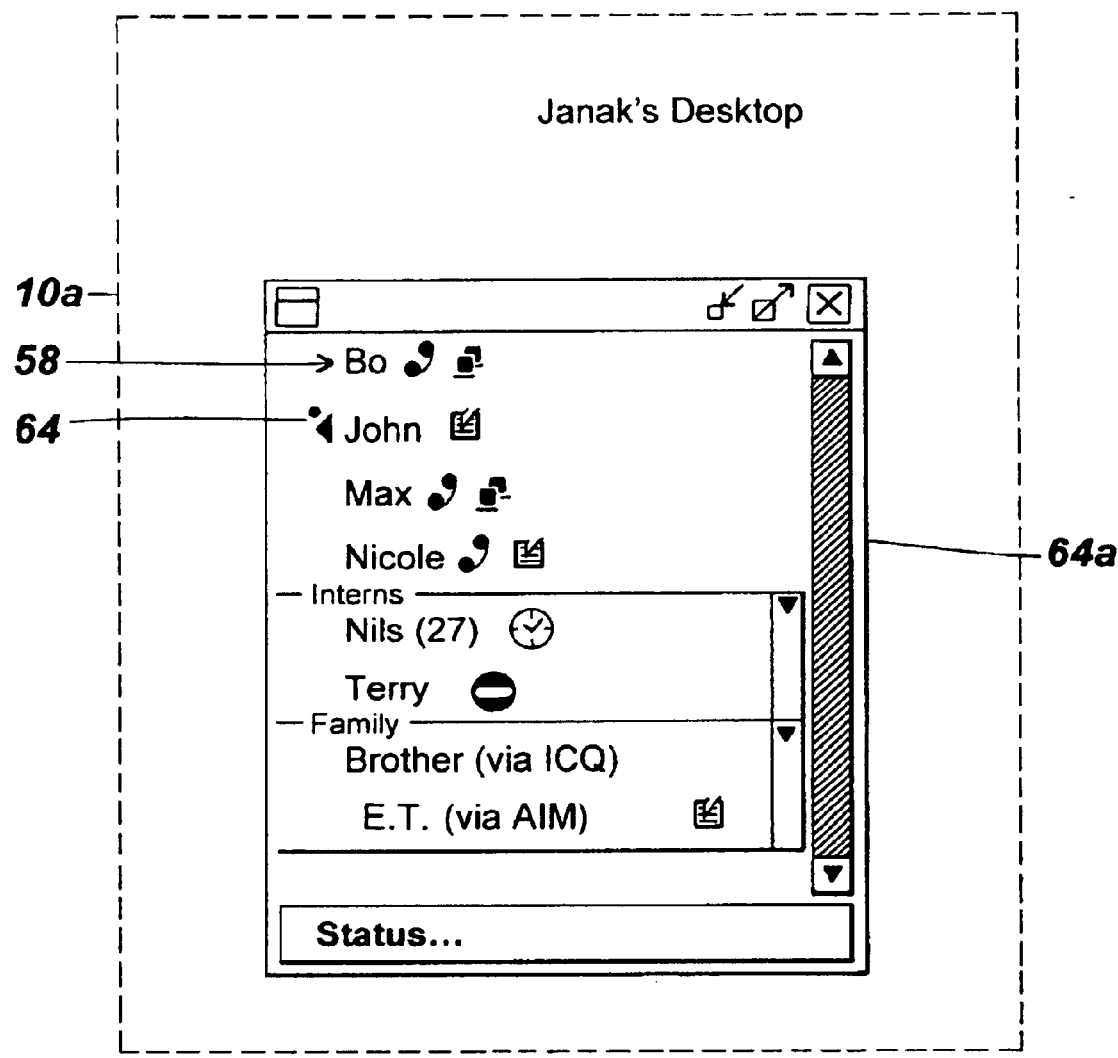
FIG. 6B shows the display window of the intended recipient of the initiator of FIG. 6A which illustrates a graphical icon informing the intended recipient of the initiator's request for establishing a communication link.
Figure 6C:
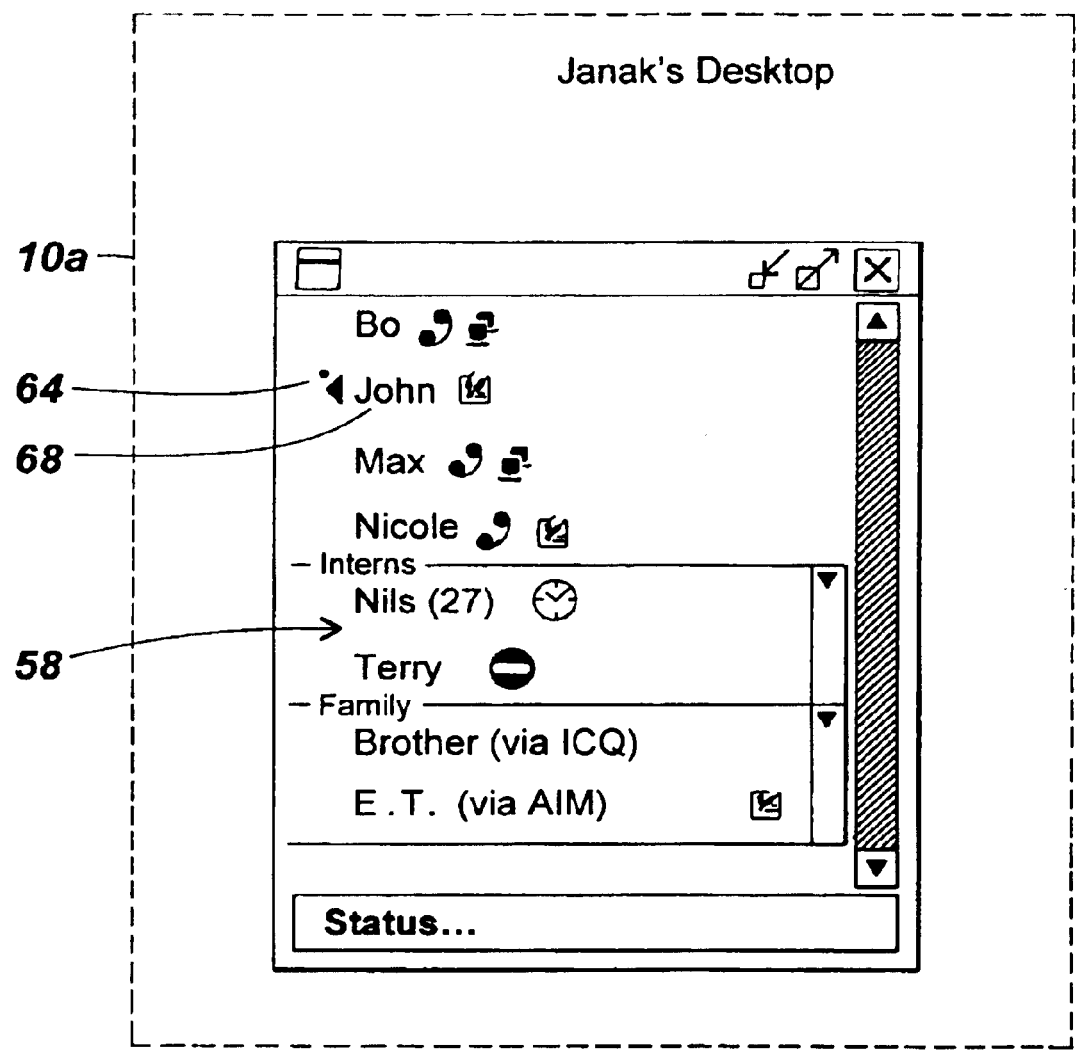
FIG. 6C illustrates the display window of FIG. 6B with addition of a contact preview window presented to the intended recipient upon a request by the intended recipient to obtain more information regarding a message that the initiator intends to transmit.

With reference to FIG. 6B, upon John's initiation of an instant messaging link, an icon 64a in Janak's display window 58 informs Janak of John's intention to establish a communication session. Before accepting or ignoring John's request for establishing a communication session, Janak may want to have some information regarding the message that John intends to transmit. FIG. 6C shows that in the illustrative embodiment of the invention, Janak can position a mouse cursor over the animated icon 64 to initiate opening a contact preview window 68 that includes the message that John has provided in the message window 66. For example, in this illustrative example, Janak knows that John has a question. This information helps Janak to decide whether to accept or ignore John's request. Janak may decide to ignore John's attempt to initiate a communication session. Janak may even decide to start some other activity, for example initiating a telephone call, to provide a plausible reason why Janak is not responding to John's request.

Figure 7A:
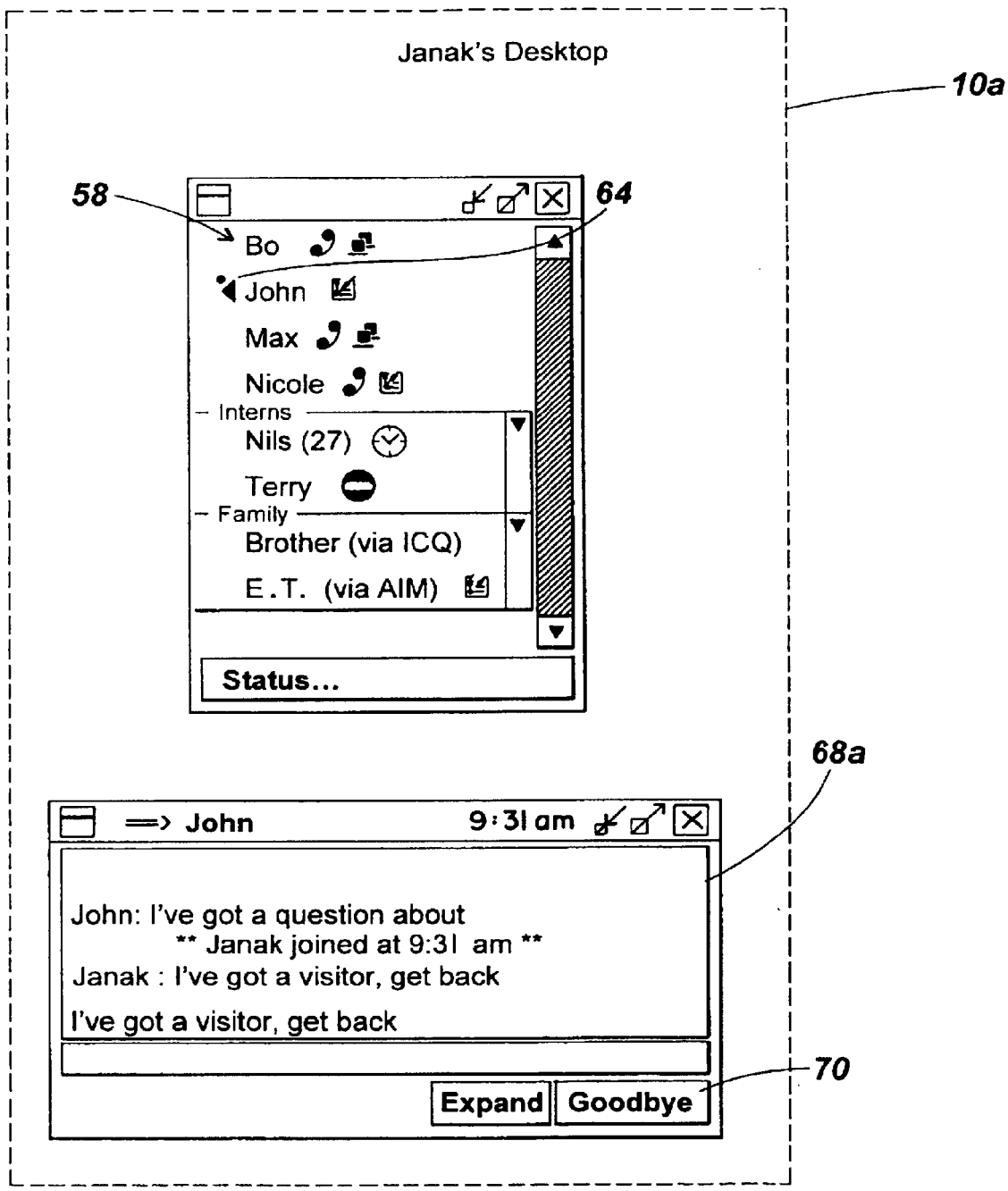
FIG. 7A illustrates the display window of the recipient and a message window presented to the recipient after the recipient accepts the initiator's request for a communication session.
Figure 7B:
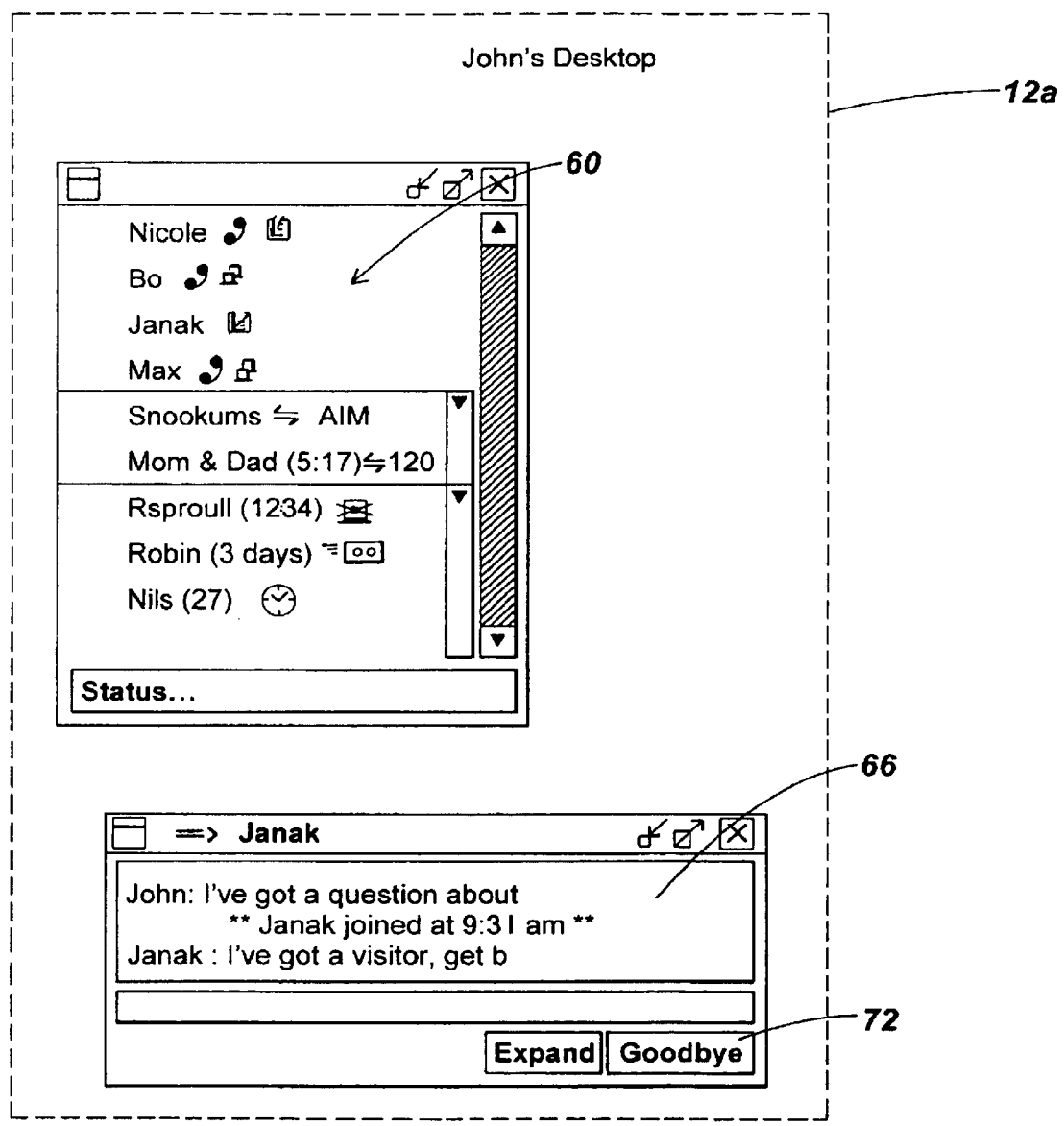
FIG. 7B illustrates the display and message windows of the initiator after a communication session is established with the recipient.

With reference to FIG. 7A, If Janak decides to accept John's request for establishing a communication session, Janak can simply select John's name in the display window 58, for example by double clicking on John's name, or clicking on the animation icon 64, to open a message window 68a to establish a communication session with John. As shown in FIG. 7B, once the communication session is established, the background color of John's message window 66 changes from gray to white. The change in the background color indicates to John that a communication session with Janak has been established. In addition, the background color of Janak's message window is also white, indicating to Janak that John's message window 66 is open. Some preferred embodiments of the invention provide the parties with an audio signal in lieu of or in addition to a visual signal to indicate that a mutual communication session has been established.

John and Janak can provide messages in their respective message windows 66 and 68a to be transmitted to the other party. Hence, John and Janak can engage in a conversation in real time.

Physically co-located individuals typically provide each other with non-verbal indications of an intent to end a conversation. The illustrative embodiment provides termination signals, analogous to those transmitted among physically co-located individuals, to inform Janak that John intends to terminate its participation in an established communication session.

Figure 8A:
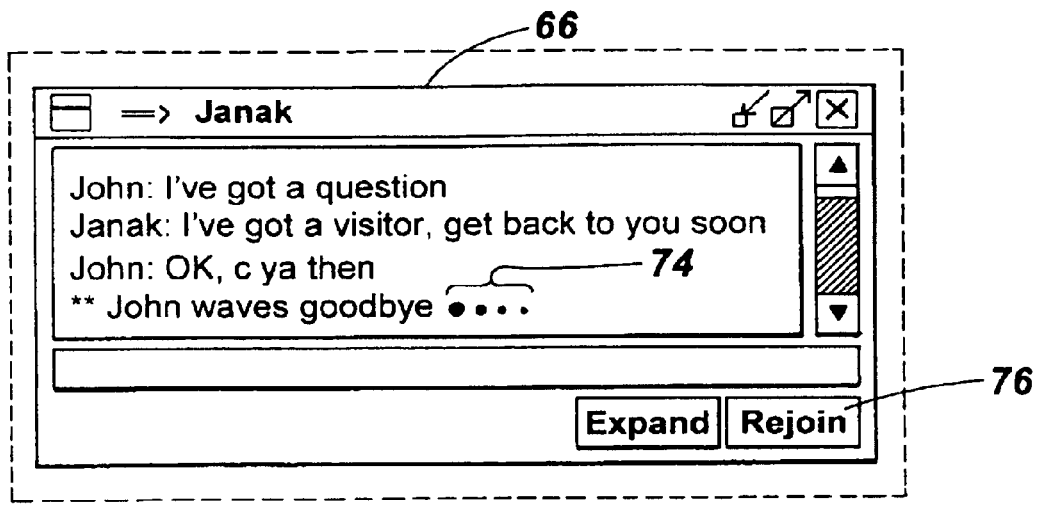
FIG. 8A illustrates the message window of the initiator, where the message window includes a signal indicating that the initiator intends to terminate its participation in the communication session.
Figure 8B:
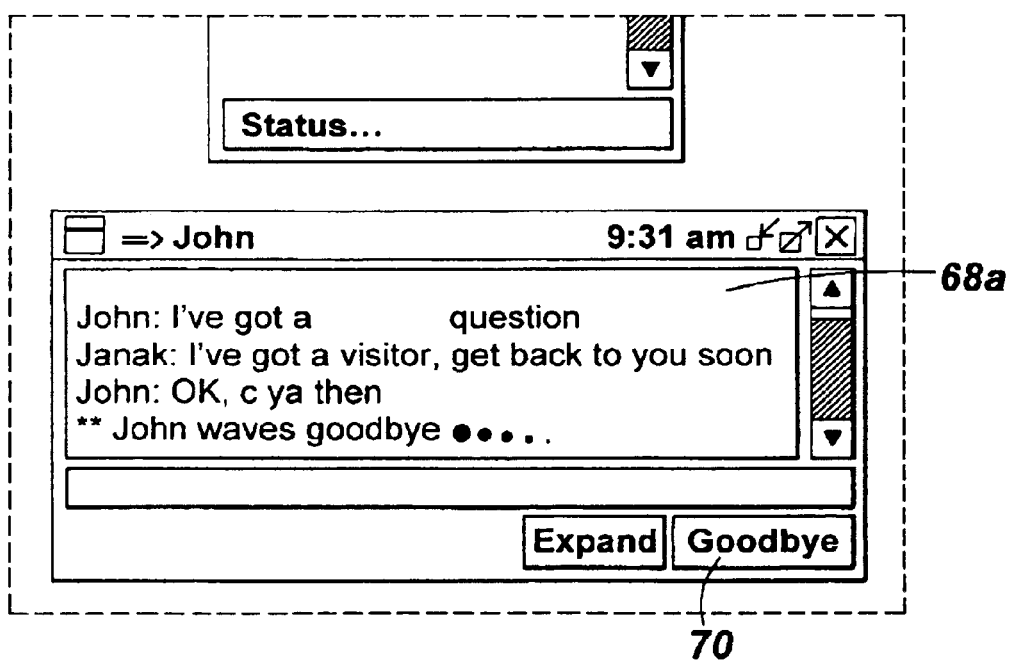
FIG. 8B illustrates the message window of the recipient, where the message window includes a signal indicating that the initiator intends to terminate its participation in the communication session.

Referring to FIGS. 7A, 7B, 8A and 8B, the illustrative embodiment presents each party with a user interface element, such as a Goodbye button 70 or 72 in the message window 68a or 66. These user interface elements allow either Janak or John to terminate her/his participation in an established communication session. In the illustrative embodiment, John can select the Goodbye button 72, for example through a point and click operation, to initiate the termination of its participation in a communication session with Janak. Upon John's initiation to terminate its participation in an established communication session, the illustrative embodiment initiates a count-down period having a selected duration, for example several seconds, before terminating the link established between John and Janak. Further, as shown in FIGS. 8A and 8B, the illustrative embodiment provides a message indicating John's intention to terminate its participation in the communication session. The exemplary message in this embodiment appears in both message windows 66 and 68a, and recites: "John waves goodbye." In addition, the illustrative embodiment provides another visual signal in the form of a plurality of dots 74 to indicate John's intention to terminate the communication session. The plurality of dots 74 start appearing in a sequential manner during the count-down period. In this illustrative embodiment, each dot has a diameter that is smaller than a diameter of a previous dot, thereby depicting in an approximate and schematic manner the remaining time of the count-down period. Those skilled in the art will appreciate that a termination signal can be visual or audio or both. Further, different messages, textual or graphical or a combination thereof, can be employed to signal a party's intention to terminate its participation in an established communication session.

Further, this practice of the invention provides a user interface element, such as a Rejoin button 76 in the message window 66, to allow John to abort the impending termination of its participation in the communication session during the count-down period. For example, upon becoming aware of John's impending departure, Janak may transmit a last-minute thought to John, which in turn may prompt John to want to continue the conversation. John can conveniently select the Rejoin button 76, for example through a point and click operation, or begin typing in the message window 66, to abort the termination of the communication session with Janak.

The termination signal and the count-down period of the present invention provide a number of advantages over prior art tools, such as those employed in instant messaging chat interactions, for ending a communication session. Such prior art tools, upon a party's initiation to terminate its participation in a communication session, typically break a communication link established between the initiating party and the other parties without providing any advance notice regarding the termination. In such systems, it is cumbersome for the initiating party to restart the conversation with the other parties, for example to convey any last-minute thought, after terminating its participation in the communication session. For example, the initiating party has to re-establish its connection to a network to rejoin the communication session.

Figure 9A:
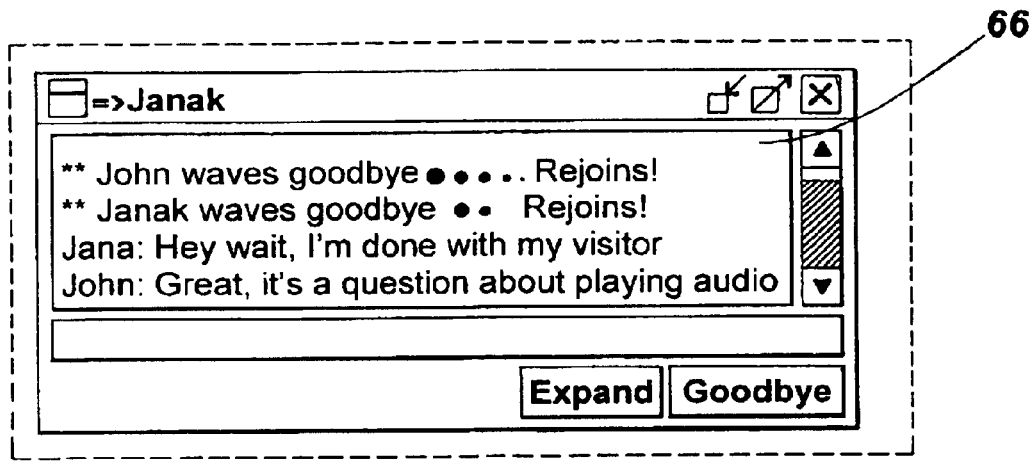
FIG. 9A illustrates the message window of the initiator containing a message that the initiator has aborted an impending termination during a count-down period.
Figure 9B:
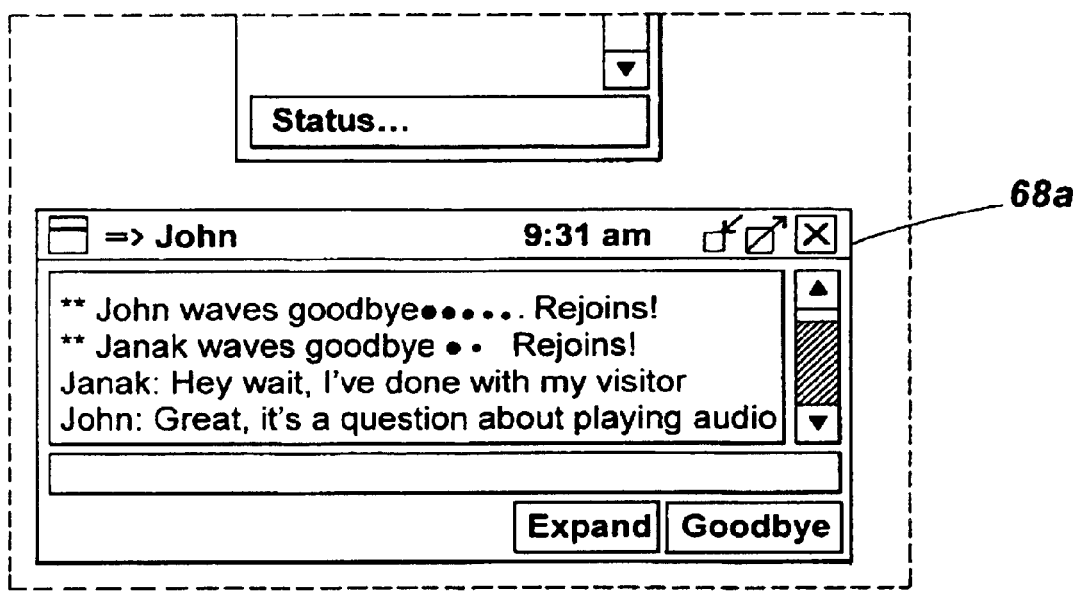
FIG. 9B illustrates the message window of the recipient containing a message indicating that the initiator has aborted the impending termination during the count-down period.

In contrast, the system of the invention prevents a premature termination of a communication session by informing other participants of the terminating party's intention to end its participation in the session. This provides the other participants a chance to convey any last-minute thoughts to the terminating party. Further, the system of the invention allows the terminating party to abort the impending termination during the count-down period without a need to re-establish the communication link. For example, in the illustrative embodiment, John can select the Rejoin button 76, or simply start typing in the message window 66, during the count-down period to abort the impending termination of its participation in the communication session with Janak. In such a case, the illustrative embodiment provides a message, e.g., Rejoins, in John's and Janak's message windows 66 and 68a, as shown in FIGS. 9A and 9B, indicating that John has aborted the impending termination, thereby allowing the conversation to continue.

Thus, the present invention advantageously provides visual and/or audio signals to parties engaged in a communication session, akin to the signals shared by physically co-located individuals, to inform each party that another party intends to terminate its participation in the communication session. Such signals allow each party to smoothly end its participation in the communication session.

Figure 10A:
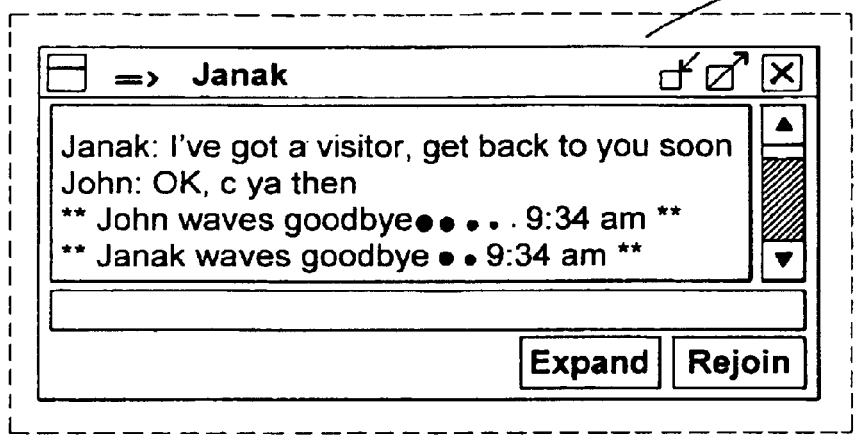
FIG. 10A illustrates the message window of the initiator, and further illustrates a message in the form a time stamp indicating disconnection of the communication link with the recipient.
Figure 10B:
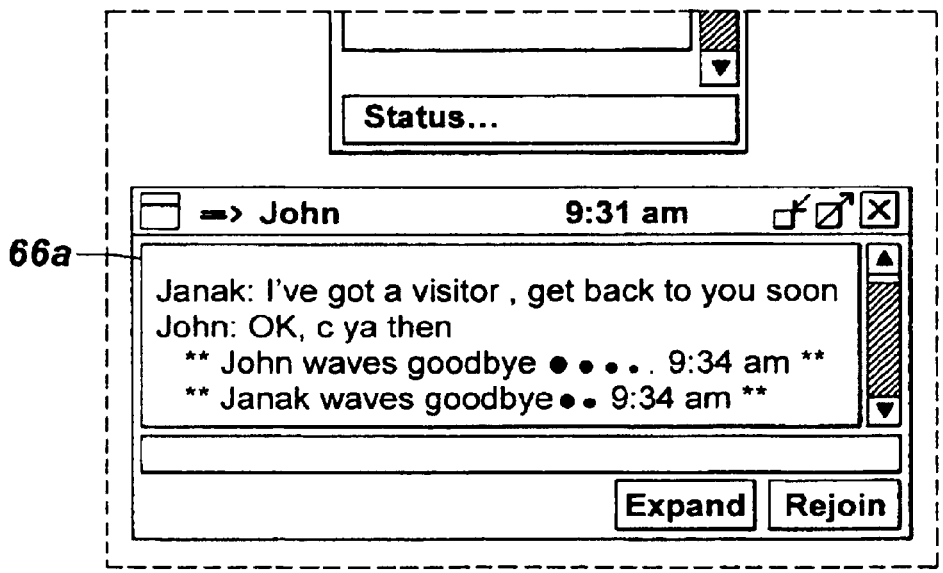
FIG. 10B illustrates the message window of the recipient, and further illustrates a message in the form of a time stamp indicating the disconnection of the communication link with the initiator.

Upon the expiration of the count-down period, the system of the invention disconnects the communication link established between the terminating party and the other parties. The system of the invention further provides visual and/or audio signals confirming the termination of the communication link between the terminating party and the other parties. With reference to FIGS. 10A and 10B, if John allows the count-down period to expire without aborting the initiation of the termination of the communication session, the illustrative embodiment disconnects the communication link established between John and Janak. Upon the disconnection of the communication link, the illustrative embodiment provides a time stamp, e.g., 9:34 am, in both Janak's and John's message windows 66 and 68a to indicate the time at which John's communication with Janak is terminated.

Figure 11:
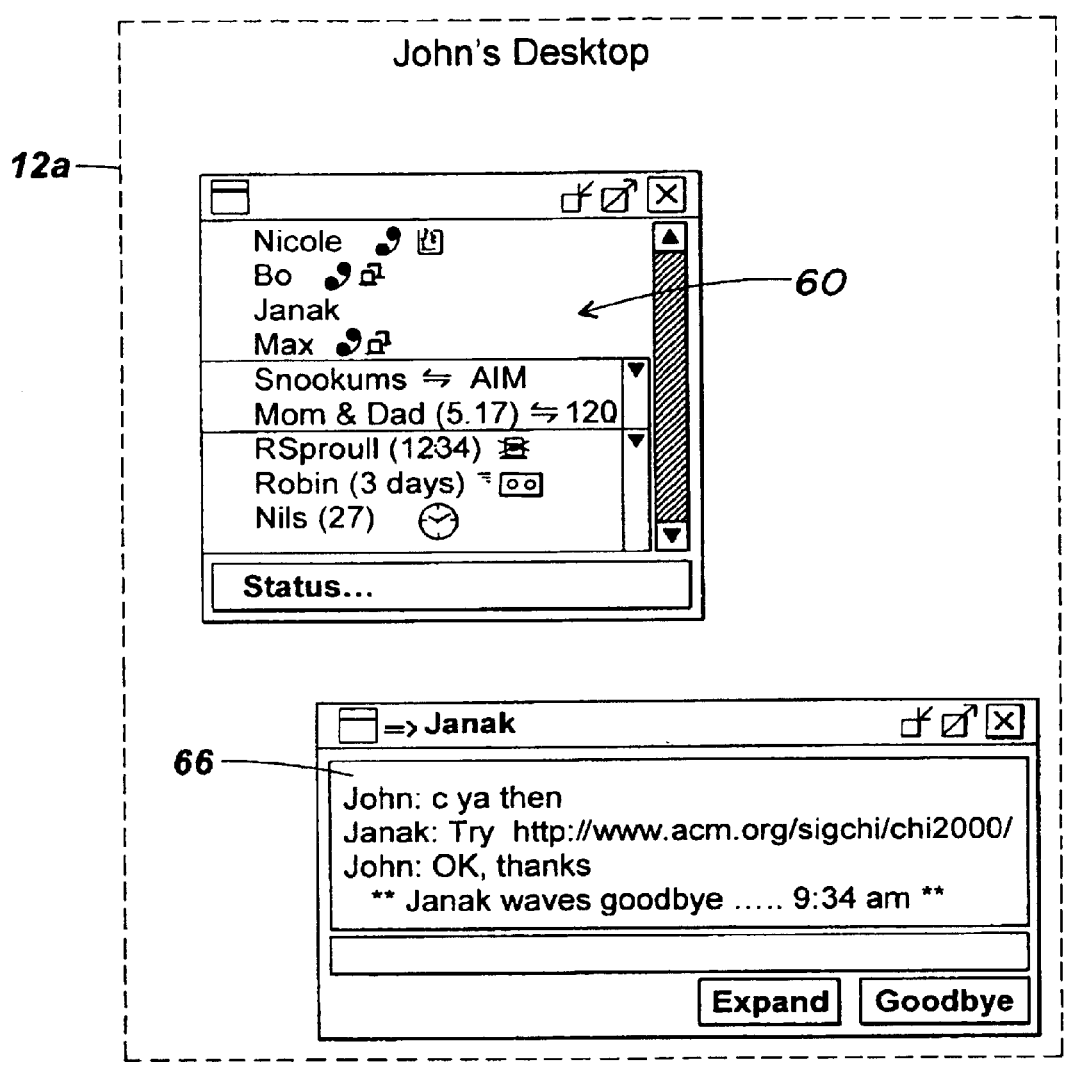
FIG. 11 illustrates the initiator's desktop having a display window and a message window which is open after the disconnection of the communication link with the intended recipient, where the background color of the message window indicates that no communication session is present.

In another aspect, the system of the invention allows a party engaged in a multiparty communication session to keep its message window open even after the departure of the other parties. In such a situation, the system of the invention provides the remaining party with a visual and/or an audio signal, such as the background color of its message window, to remind the remaining party that no communication session exists. As an illustrative example, FIG. 11 illustrates John's desktop 12a after Janak has terminated its participation in a communication session with John. John has, however, kept its message window 66 open after Janak's departure, for example to retrieve a URL that Janak had earlier transmitted. In this illustrative embodiment, the gray color background of John's message window provides a visual signal to John that no communication session with Janak exists. Those skilled in the art will appreciate that other signals, both visual and/or audio, can be employed in the system of the invention to indicate to the remaining party that an active communication session does not exist. For example, one practice of the invention employs a textual message to remind the remaining party that no active communication session exists.

Figure 12:
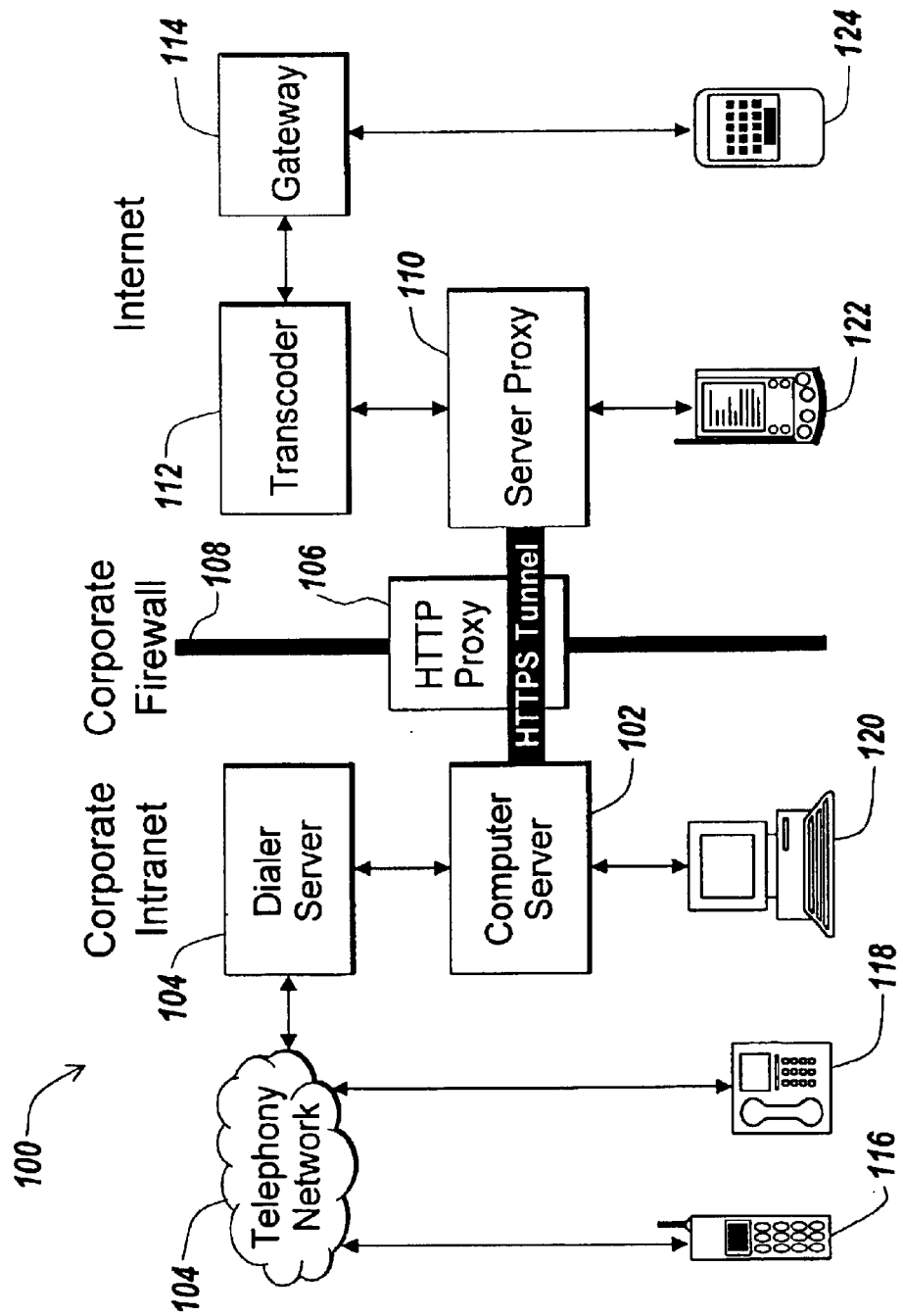
FIG. 12 illustrates an awareness information system for implementing an embodiment of the present invention in a spatially distributed environment.

FIG. 12 illustrates a further application of the teachings of the present invention. An awareness information system 100 is provided. The system 100 includes a computer server 102 for managing awareness information on behalf of the system 100. The computer server 102 can take the form of a programmable device that responds to a specific set of instructions in a well-defined manner and can execute a set of instructions. The computer server 102 can include or more storage devices, which enable the computer server 102 to store, at least temporarily, data, information, and programs, such as RAM. The computer server 102 can include a mass storage device for substantially permanently storing data, information, and programs (e.g., disk drive or tape drive). An input device can be provided through which data and instructions enter the computer server 102 (e.g., keyboard, mouse, or stylus). An output device can also be provided to display or produce results of computing actions (e.g., display screen, printer, or infrared, serial, or digital port). The computer server 102 further includes a central processing unit including a processor for executing the specific set of instructions.

The system 100 illustrated is a centralized system having a set of device-dependent clients and two main server components, a main computer server 102 and a telephone dialer server 104. The computer server 102 can have one or more desktop computers 120 connected thereto, likely through a network, such as a corporate intranet. The computer server can have one or more communication means for communicating with remote sources, such as, for example, over a network. The one or more communication means can be, for example, a modem, cable modem, network interface, telephone interface, infra-red interface, RF interface, audio interface, visual display, wired connection, or wireless connection.

The computer server 102 interacts with the dialer server 104. The dialer server 102 includes a multi-line telephone switch. The dialer server 104 may be, for example, a private branch exchange (PBX) or an automatic call distributor (ACD). The dialer server 104 may also include a voice response unit (VRU) that reacts to voice and implements voice commands. The dialer server 102 is responsible for placing calls between users of the system 100 and providing a speech interface to the system 100. The dialer server 102 is connected with a telephony network 104 to implement the required telephonic actions with mobile phones 116 and standard phones 118.

The computer server 102 also connects with a server proxy 110 within a wide area network, such as the Internet, via an HTTP proxy 106 that forms an encrypted HTTPS tunnel. In the example embodiment, the server proxy 110 is positioned on an opposite side of a corporate firewall 108 from the main computer server 102. However, such an arrangement depends on the configuration of the network system in which the awareness information system 100 is employed. The corporate firewall 108 does provide added protection to the main computer server 102 and the dialer server 104. The server proxy 110 enables the communication between the system 100 and, for example, a PDA 122 running the PALM OS (PALM and PALM OS are trademarks and/or registered trademarks of Palm, Inc. of Santa Clara, Calif.) operating system, as will be later described herein.

The server proxy 110 also connects with a transcoder 112. The transcoder 112 is responsible for translating messages between the server proxy 110 and a pager network gateway 114, such as the Mobitex pager network gateway used by the RIM BLACKBERRY 124 (BLACKBERRY is a trademark and/or registered trademark of Blackberry Technologies, Inc. of New York, N.Y.).

In operation, the present invention enables mobile users away from their office or desktop computer 120 to maintain awareness of their colleagues, while the colleagues can contemporaneously maintain awareness of the mobile users when they are away from their desktop computer 120. More specifically, each user of the present invention is registered with a central location, such as the computer server 102. The registration provides a correlation between each electronic device of the user, and a specific locale. For example, a desktop computer at home is identified in the "home" locale. A mobile phone in a car is identified as, e.g., a "car" locale. A notebook computer not connected in an office docking station is, e.g., a "remote/mobile" locale. The specific name of the locales can vary, but should provide an indication of where the selected user may be based on the location and use of a specific electronic device.

Figure 13:
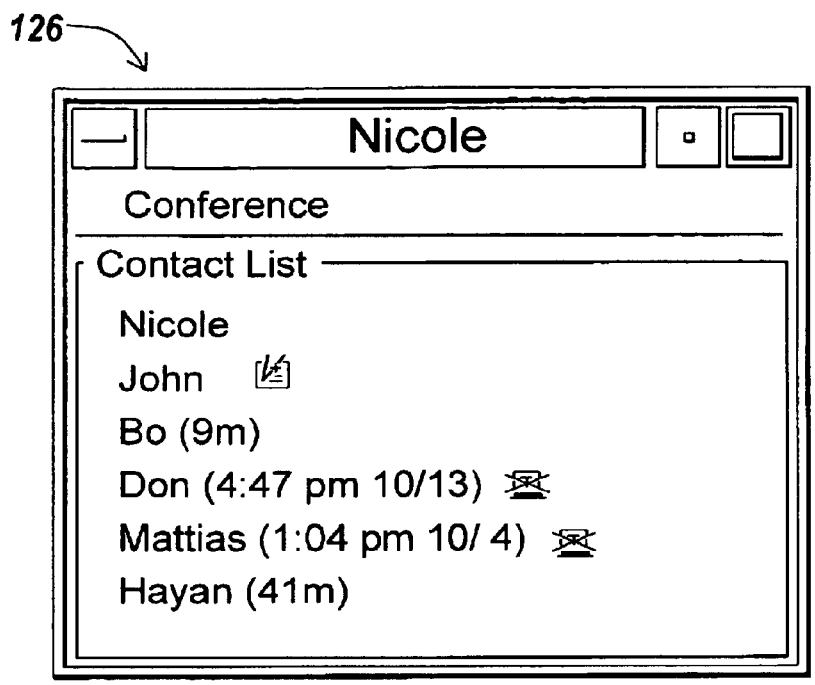
FIG. 13 illustrates a contact list in accordance with one embodiment of the present invention.

Similar to previous embodiments, a contact list 126 provides awareness for a pre-selected list of users by showing electronic devices (e.g., data processing devices or telephone devices) corresponding to each user, whether such devices are active, time since the devices were last active, and whether a selected user has logged out. The illustration of FIG. 13 shows the contact list 126 for Nicole. The contact list 126 provides awareness information for the selected users Nicole has chosen to place on the list. A selected user is a user being identified for an attempt at communication, while an initiating user is a user making the attempt.

Each entry shows whether the selected user is connected to the awareness information system 100, whether input devices (e.g., keyboard, mouse, or stylus) have been idle, and whether the selected user is engaged in any computer or telephone related activity. More specifically, John's entry shows he is currently involved in an instant message session with another user. Bo's entry shows his computer has been idle for 9 minutes. Don's entry can be shown in gray text as it indicates Don logged out of his computer at 4:47 PM on November 13. Mattias is also logged out, and Hayan has been idle for 41 minutes.

Figure 14:
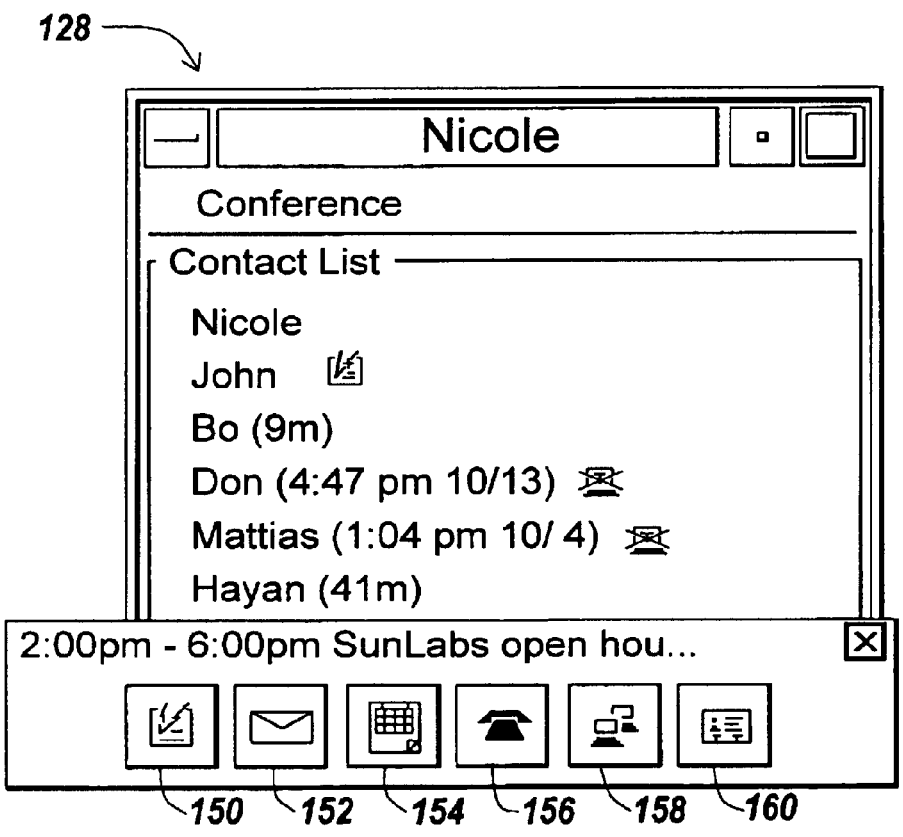
FIG. 14 illustrates a contact toolbar in accordance with an embodiment of the present invention.

A contact toolbar 128, illustrated in FIG. 14, provides additional details of the activities of a selected user, and provides icons 130 indicating communications resources relevant to the selected user. The example shows that when Nicole selects Mattias, the contact toolbar 128 appears. At the top of the contact toolbar 128 is one line of information about the most salient appointment for Mattias (either an appointment that is scheduled to occur contemporaneous with the inquiry, or the next appointment, if any, scheduled for the day). The row of buttons, or icons 130, present the relevant communication resources for initiating communication with Mattias. Proceeding from left to right, Nicole can initiate an instant message ("IM") chat with button 150, open an email compose window with button 152, browse the full version of Mattias' calendar with button 154, call Mattias on the telephone with button 156, start a desktop conference with button 158, or access Mattias' on-line directory card with button 160, which provides additional contact information. One of ordinary skill in the art will recognize that these icons 130 and corresponding features can vary depending on available communication technologies, and the number and type of electronic devices utilized by the selected user, i.e., Mattias.

Figure 15:
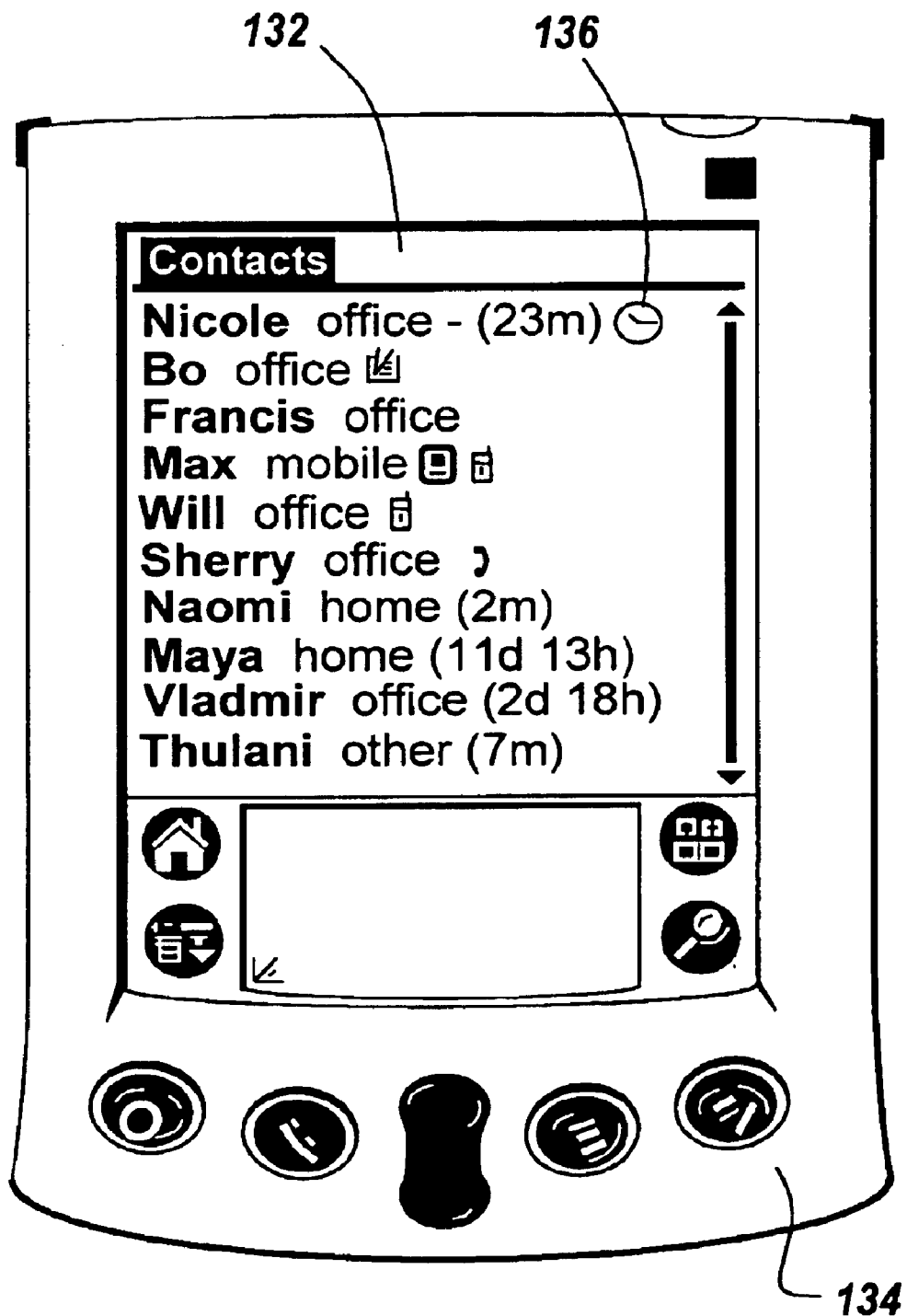
FIG. 15 illustrates a contact list implementation on a PDA in accordance with the teachings of the present invention.

FIG. 15 illustrates the implementation of a contact list 132 on PDA 134. The PDA illustrated is operating the PALM OS operating system, but a number of different PDA operating systems can be utilized in accordance with the teachings of the present invention. Each entry in the contact list 132 includes a name of each selected user, the locale where that selected user is, or was most recently, active, and any communication activity information. FIG. 15 shows that Nicole was most recently in her office, but her computer has been idle for 23 minutes. The clock icon 136 indicates that Nicole has an appointment scheduled in her on-line calendar. The clock icon 136, in combination with the computer idleness, provides the user with an indication that Nicole is most likely unavailable for communication.

A few entries down on the contact list 132, Max is shown to be mobile, and is currently using a wireless handheld, or mobile phone, and one a call. Will's most recent activity was on a mobile device, but he has been idle for 6 minutes. Sherry is currently in a call from her office desk phone. Naomi is at home, where her computer has been idle for 2 minutes. Maya and Vladmir are both logged out, while Thulani is at an other locale (e.g., a satellite work site) and is on the phone.

It should be noted that the times are presented in a different format from that of previous FIGS. 13 and 14. The times in FIG. 15 are in relative format, verses calendar format. In other words, the times are relative to a last action, rather than a date or absolute time. This format avoids problems such as an indication of someone logging out at 3:18 PM, but not know what day the action occurred. This is especially helpful when users are spread across multiple time zones.

In the instance where a selected user is taking short trips or attending meetings throughout the day, many users would likely remain logged-in to an office desktop computer, even though they are not there. The awareness information system 100 can allow for the selected user becoming active from another location (i.e., mobile device, home computer, satellite office). For the contact list 132, the awareness information from the locale experiencing the most recent activity is displayed. More detailed awareness information is also available as described below.

The computer server 102 performs the function of the overall management of the awareness information. The server 102 also coordinates the communication with each of the electronic devices 116, 118, 120, 122, and 124 (see FIG. 12). One of ordinary skill in the art will appreciate that the actual protocol for communication can vary. For example, the server 102 can initiate and maintain constant contact, or periodic contact with each of the electronic devices 116, 118, 120, 122, and 124. Alternatively, each of the electronic devices 116, 118, 120, 122, and 124 can independently contact the server 102 to maintain a constant or periodic communication. The communication can occur over a wired network and/or a wireless network. The awareness information is stored in a location accessible by the server 102.

Figure 16:
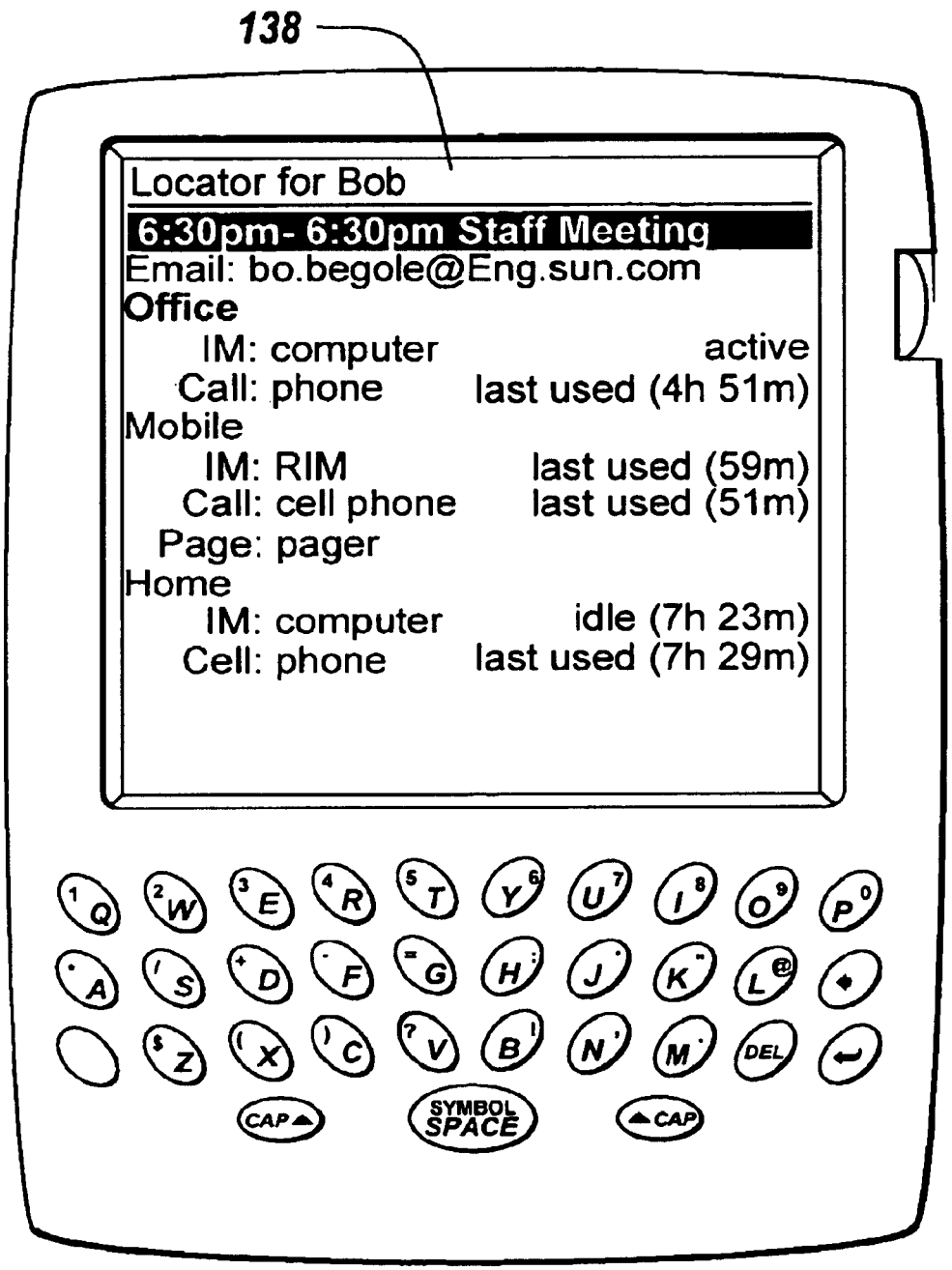
FIG. 16 illustrates a contact locator implementation on a PDA in accordance with further teachings of the present invention.

FIG. 16 shows a contact locator 138. Selecting an entry in the contact list 132 brings up a contact locator 138 for that selected user. The contact locator 138 provides more detailed awareness information, and presents options for contacting that selected user. The contact locator 138 is shown on an RIM BLACKBERRY in FIG. 16 for purposes of illustration. Other electronic devices can display the contact locator 138 as desired.

The first line in the contact locator 138 shows the most salient appointment for the selected user (either a contemporaneous or a next occurring appointment). The next line shows an email address for the selected user, which can be selected to bring up an email compose window addressed to the selected user. The remainder of the contact locator 138 shows the locales of which the awareness information system 100 is aware, the contact devices or electronic devices within each locale, and the awareness information about each device. The locales are sorted according to the most likely locale to reach the selected user (for example, the locale of the most recent activity). The most likely locale for finding the selected user is bolded and positioned at the top of the list.

The algorithm of placing the locale having the most recent activity at the top of the list is merely one example embodiment for the implementation of the present invention. One of ordinary skill in the art will appreciate that more complex algorithms can be utilized. For example, the selected user may be able to introduce weighted values to the selection of most likely locale for someone to find them. Alternatively, the selected user may be able to designate an electronic device, such as a mobile phone, to appear at the top of the list at all times because no matter what their location, they always carry their mobile phone. In addition, the user viewing the contact list 138 may need to perform some interpolation based on the information provided in the contact list 138 to identify the most likely locale for communicating with the selected user. All of these scenarios are contemplated by the present invention.

Within each locale, the electronic devices are listed with their status or awareness information. In FIG. 16, Bo is most recently active in his office and has devices in two other locales (mobile and home) through which he can be contacted. Clicking on, or selecting, an entry for a device initiates a communication attempt to that selected user at that device as described below.

It should be noted that the electronic devices can be split into two categories: those that are usually on and used somewhat continuously, and those that are usually inactive and used intermittently. This differentiation can determine the type of awareness information provided about that device. A computer is used somewhat continuously, thus the awareness information that is reported is any idle time, or time since the selected user has logged out. Mobile devices and telephones are used intermittently, or are inactive. Thus, the awareness information shows when the devices are actively being used (e.g., in the contact list, a phone icon appears when the selected user is on a call). Otherwise, the time since the device was last used is shown.

The contact locator 138 also provides access to communication resources that are not specific to a locale. These can be offered, for example, as menu options that are presented when any item is selected, or shown in an overlaid toolbar.

These resources can include an interface for browsing through the next week of calendar appointments for the selected user, and browsing the electronic business card information for the selected user. There is also a navigation mechanism for getting back to the contact list 132.

The user can initiate an attempt to communicate with a selected user at a specific device from the contact locator 138. Clicking on a device that can receive an IM brings up an IM interface. The IM interface can be an IM chat that bridges across different devices or platforms. For example, a PDA can communicate with a desktop computer. In instances where latencies in the system for transporting the communication, such as a wireless network, are such that character-by-character display of the IM text is impractical, the text can be buffered and transmitted in larger blocks, such as complete sentences.

Figure 17:
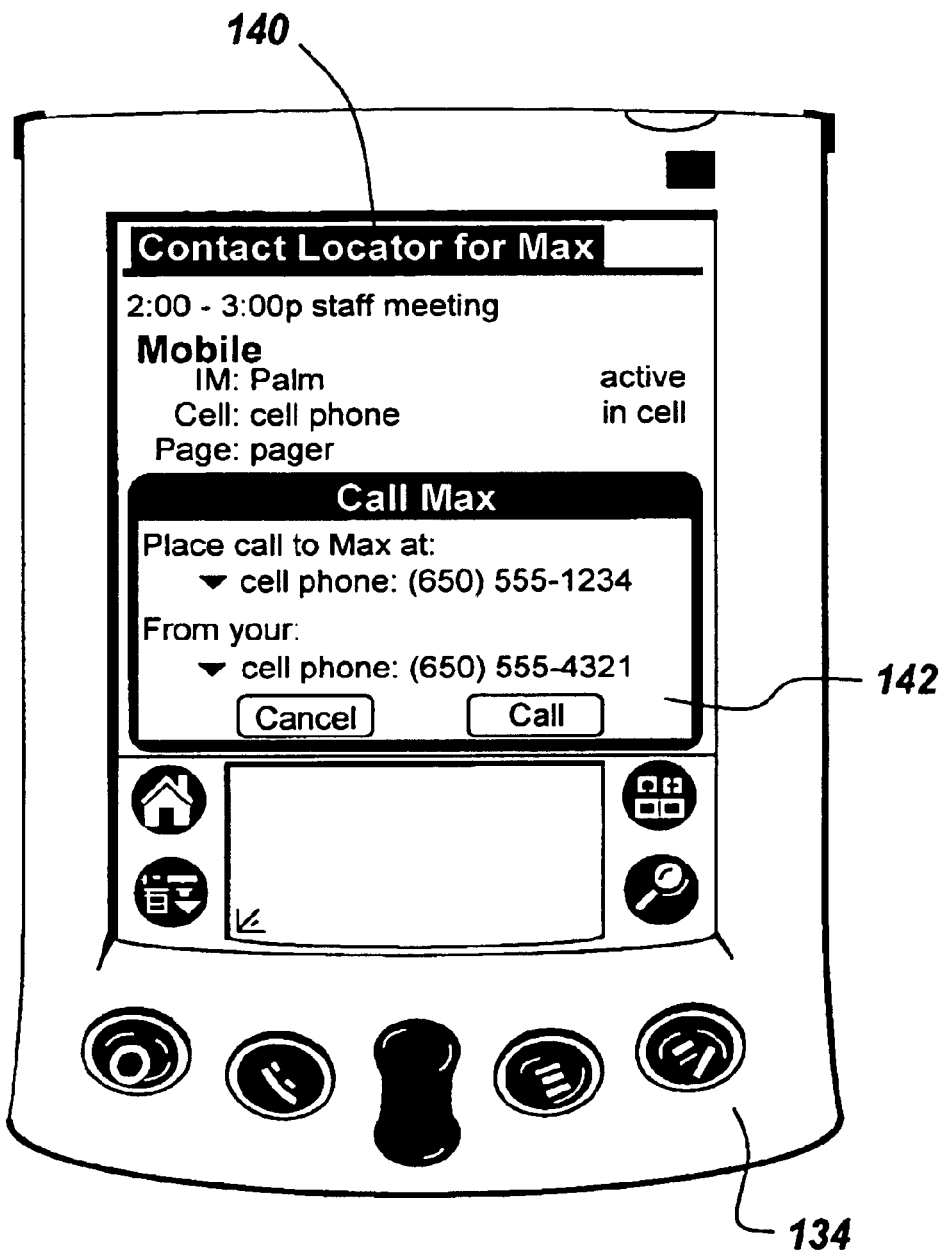
FIG. 17 illustrates a call request implementation in accordance with the teachings of the present invention.

Clicking on a telephone entry brings up the telephone interface 140 shown in FIG. 17 on the PDA 134. The display shows placing a call to the selected user at the device selected. The awareness information system 100 makes a guess about which phone to use for the user of the PDA 134 to place the call. If the initiating user is using the PDA 134, the system 100 assumes the user is mobile and selects the user's mobile phone as the source of the call. If the initiating user were using their desktop computer 120, the system 100 would select their standard office telephone 118. A pop-up menu next to each phone number offers other phone numbers for the selected user so the initiating user can easily re-direct the call, if necessary. Once the phone number is confirmed, the initiating user presses the call button 142, the system 100 calls the initiating user's phone 116 or 118, places the call to the selected user, and updates the awareness information for both the initiating user and the selected user to show that both are on a call.

Selecting to send an email brings up a compose window for the selected user's default email address. People generally have only one email address, which they re-direct with forwarding protocols if necessary. If the selected user has more than one email address, a menu can be provided to list all of the available email addresses.

Figure 18:
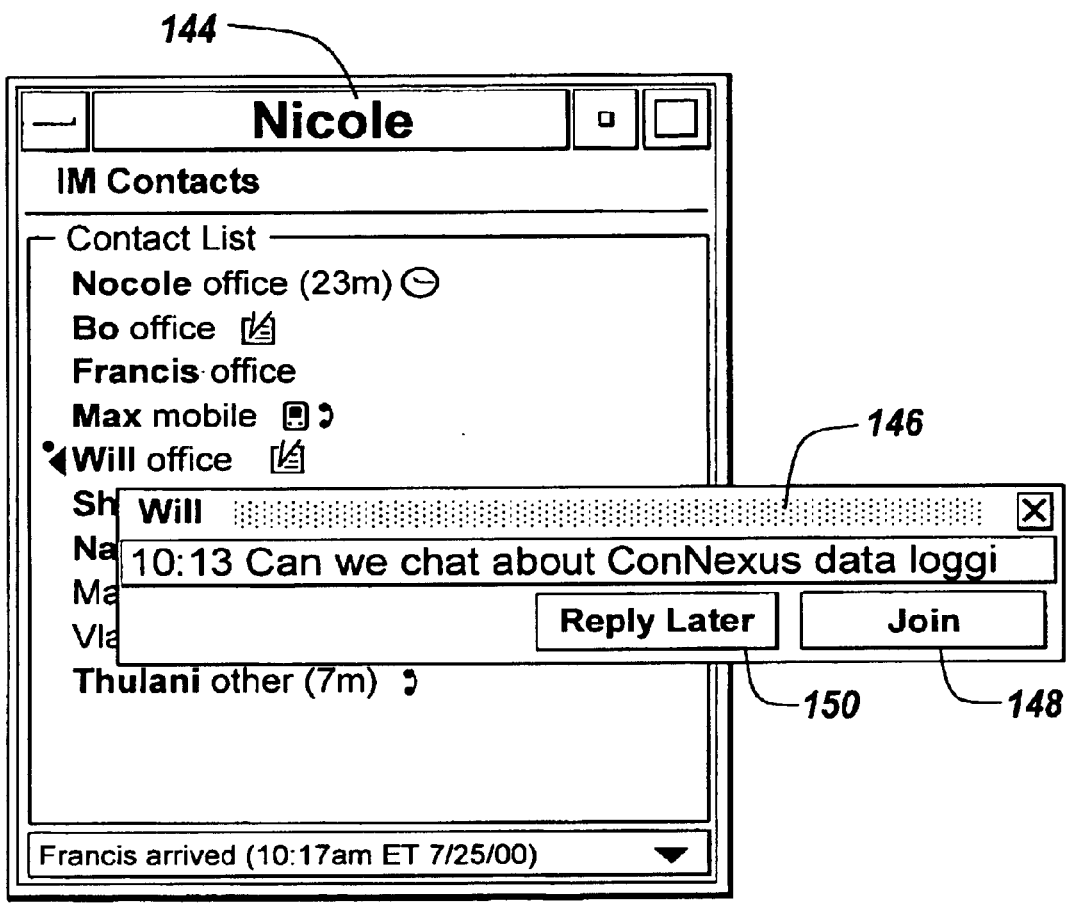
FIG. 18 illustrates a preview window implementation of an IM communication in accordance with one embodiment of the present invention.

FIG. 18 illustrates the result on a selected user's electronic device display 144 of an initiating user attempting to initiate a communication session with the selected user. The initiating user (Will) beings to write an IM to the selected user (Nicole). A preview box 146 pops up automatically and relays the message as Will types the message. Nicole then has the option to join the IM chat with Will by clicking on the "Join" button 148, reply at a later time by clicking on the "Reply Later" button 150, or simply ignore the message. The option to reply later can trigger an automatic alarm or reminder to remind Nicole that Will sent a message. The labels on the buttons 148 and 150 can vary, along with the particular function of the button, as understood by one of ordinary skill in the art.

Figure 19:
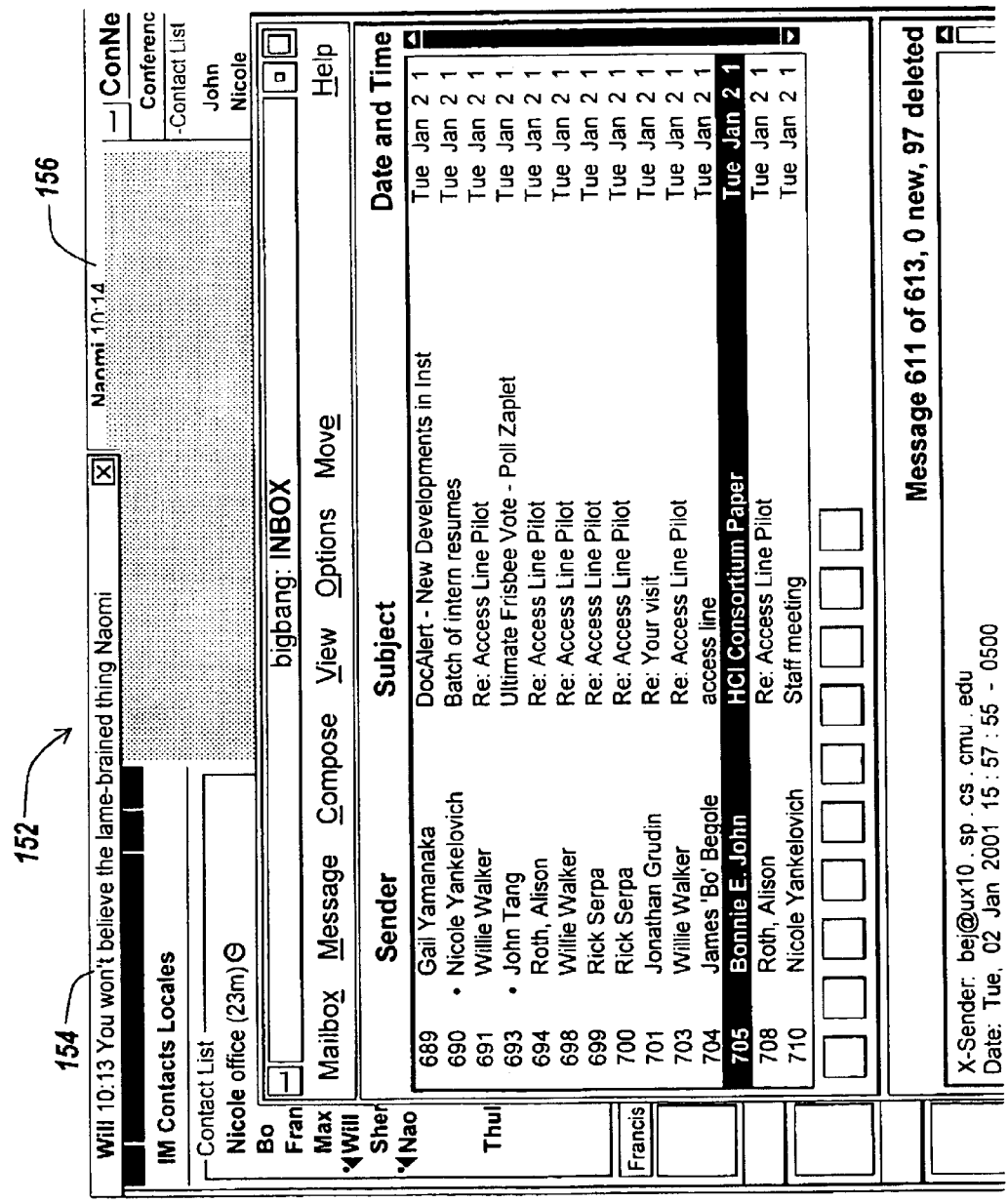
FIG. 19 illustrates a preview window implementation of an IM communication in accordance with another embodiment of the present invention.

FIG. 19 illustrates another embodiment of the preview box in the form of a slide down preview box 154. The figure shows a desktop display 152 of a selected user. When an initiating user, such as Will, begins to write an IM directed to the selected user, such as Nicole, the preview box 154 appears. This implementation differs from the previous example in a number of different ways. The preview box 154 slides down from the top of the desktop display 152, resulting in a less disruptive, less obtrusive, indication that the initiating user is attempting to communicate with the selected user. The more subtle preview box 154 allows the selected user (Nicole) to more easily ignore the IM if desired. Alternatively, Nicole can simply click on the preview box 154 to join an IM chat session with Will, or click on the "X" box to close the preview box 154.

The preview box 154 can also stack on top of other, previously established, preview boxes, such as preview box 156. In the illustrated embodiment, Naomi had first attempted to initiate communication with Nicole in preview box 156, and the preview box 154 from Will stacked on top of the preview box 156 from Naomi. Again, the unobtrusive nature of the slide down preview box 154 and 156, and the stackability of the preview boxes 154 and 156, allows the awareness information system 100 to operate in a non-disruptive manner with other applications and the user.

Users using the awareness information system 100 can access the awareness information while using electronic devices without displays, such as the mobile phone 116. For example, if an initiating user calls a selected user's phone, and the selected user does not answer, the initiating user can identify himself to the awareness information system 100 as a user and go through a routine such as the following:

System: "Would you like to leave a voicemail, send a message, or check the status of Tom?"
Caller: "Check his status."
System: "Tom has a calendar entry for today that says 'working at home' and his computer at home is active. What next?"
Caller: "Call his home."
System: "Placing call to Tom's home."

The system 100 then transfers the call to Tom's home. Without a display, the system 100 does not provide all of the awareness information about a selected user, but can provide the more relevant information to suggest a best alternative to making contact with the selected user.

The awareness information system 100 communicates through the desktop client, and all server components, in the JAVA programming language (JAVA is a trademark and/or registered trademark of Sun Microsystems, Inc. of Mountain View, Calif., in the United States and in other countries). The communication programs with the PALM and BLACK-BERRY systems are written in C++. The components communicate using an ASCII message protocol. The protocol and distribution architecture are designed to support scalability through the use of multiple system 100 servers.

The menu structure for the initiating user to interact with the awareness information system 100 can vary. One example structure is described herein. An alternative structure can take the form of a traditional browser navigation format, e.g., using "back" and "forward" buttons. In addition, the menu structure organizing the awareness information by locales can also vary. Alternatively, the menu structure can organize the awareness information by, e.g., electronic device.

The present invention provides interfaces on multiple platforms for interacting with a centralized resource of dynamically changing awareness information. Coordination actions occur among different devices operating on independent networks. Telephony is integrated with other communication resources and awareness information is provided of telephony activity. In addition, IM chats are further augmented by the offering of more awareness information. Further, it is contemplated that technologies such as BLUETOOTH (BLUETOOTH is a trademark and/or registered trademark of Telefonaktiebolaget LM Ericsson Corporation of Stockholm, Sweden, in the United States and in other countries) and JINI (JINI is a trademark and/or registered trademark of Sun Microsystems, Inc. of Mountain View, Calif., in the United States and in other countries) can be implemented with the teachings of the present invention to enable a more seamless interaction among different devices on different platforms.

While the present invention has been described with reference to above illustrative embodiments, those skilled in the art will appreciate that various changes in form and detail may be made without departing from the intended scope of the present invention as defined in the appended claims.

What is claimed is:

1. In an electronic device, a method for providing one or more interfaces with a second electronic device for interacting with at least one source of dynamically changing awareness information, comprising:

the second electronic device communicating with the at least one source to update the at least one source with individual awareness information for the second electronic device; and the second electronic device communicating with the at least one source to receive awareness information relating to a third electronic device;

wherein the awareness information comprises an indication of time since the second electronic device relating to a selected user has been in use.

2. The method of claim 1, wherein the second electronic device periodically communicates with the at least one source to update the at least one source with individual awareness information.

3. The method of claim 1, wherein the second electronic device periodically communicates with the ax least one source to receive awareness information.

4. The method of claim 1, wherein the at least one source initiates the communication with the second electronic device.

5. The method of claim 1, wherein the second electronic device initiates the communication with the at least one source.

6. The method of claim 1, wherein the awareness information comprises a summary of electronic device statuses relating to a selected user.

7. The method of claim 1, wherein the awareness information comprises an indication of the second electronic device relating to a selected user being contemporaneously in use.

8. The method of claim 1, further comprising the second electronic device providing an indication of a location of a selected user based at least in part on the awareness information.

9. The method of claim 1, further comprising a user identifying the location of another selected user based on the awareness information provided to the second electronic device.

10. The method of claim 1, wherein the at least one source comprises a telephone dialer system.

11. The method of claim 1, wherein the step of communicating to update the at least one source and the step of communicating to receive awareness information occur during a same communication transaction.

12. The method of claim 1, wherein the step of communicating to update the at least one source and the step of communicating to receive awareness information comprise the transmission of at least one of data and voice.

13. In a mobile electronic device in communication with at least one source, a method of an initiating user interacting with a selected user, comprising:

communicating with the at least one source to receive awareness information relating to the selected user and at least one corresponding selected user device; and attempting to initiate a communication with the selected user based at least partially on the awareness information relating to the selected user;

the at least one corresponding selected user device indicating to the selected user a willingness to communicate of the initiating user.

14. The method of claim 13, wherein the step of attempting to initiate a communication comprises the initiating user selecting an icon representing a selected form of communication.

15. The method of claim 14, wherein the step of indicating to the selected user a willingness to communicate comprises providing a preview window on a display of the selected user device of the initiating user's communication.

16. The method of claim 14, further comprising the selected user responding with an indication of one of a willingness to communicate and an unwillingness to communicate with the initiating user.

17. The method of claim 16, wherein the indication of a willingness to communicate comprises the selected user clicking on one of a preview window and a button to join an IM chat session with the initiating user.

18. The method of claim 16, wherein the indication of an unwillingness to communicate comprises the selected user clicking on a button to one of reply later and close the preview window.

19. The method of claim 16, further comprising the selected user participating in a communication session with the initiating user.

20. The method of claim 19, further comprising at least one of the selected user and the initiating user indicating a desire to terminate the communication session.

21. The method of claim 20, further comprising providing the selected user and the initiating user an opportunity for one or more of the selected user and the initiating user to submit a last-minute thought prior to termination of the communication session.

22. The method of claim 13, further comprising the initiating user obtaining a status of the selected user and the at least one corresponding selected user device based at least partially on the awareness information.

23. The method of claim 22, further comprising the selected user receiving notification of the initiating user obtaining the status of the selected user and the at least one corresponding selected user device.

24. The method of claim 13, wherein the mobile electronic device is one of a data processing device and a telephonic device.

25. In a mobile electronic device in communication with at least one source, a method of an initiating user interacting with a selected user, comprising:

communicating with the at least one source to receive awareness information relating to the selected user; and attempting to locate the selected user based at least partially on the awareness information relating to the selected user.

26. The method of claim 25, wherein the step of attempting to locate the selected user comprises the mobile electronic device executing an algorithm to provide an indication of the selected user location based at least partially on the awareness information.

27. The method of claim 25, wherein the step of attempting to locate the selected user comprises the initiating user reviewing awareness information provided to the mobile electronic device to determine the selected user location.

28. The method of claim 25, wherein the mobile electronic device is one of a data processing device and a telephonic device.

29. In a mobile electronic device, a method for interfacing with a central electronic device, comprising:
    establishing communication with the central electronic device;
    updating the central electronic device with individual awareness information for the mobile electronic device; and
    receiving awareness information relating to at least an additional electronic device;
    wherein the awareness information comprises an indication of time since the mobile electronic device relating to a selected user has been in use.

30. The method of claim 29, wherein the step of establishing communication comprises the mobile electronic device periodically initiating communication with the central electronic device.

31. The method of claim 29, wherein the step of establishing communication comprises the mobile electronic device periodically receiving communication from the central electronic device.

32. The method of claim 29, wherein the step of establishing communication comprises the mobile electronic device continuously communicating with the central electronic device.

33. The method of claim 29, wherein the step of establishing communication comprises the mobile electronic device continuously receiving communication from the central electronic device.

34. The method of claim 29, wherein the awareness information comprises a summary of electronic device statuses relating to a selected user.

35. The method of claim 29, wherein the awareness information comprises an indication of the mobile electronic device relating to a selected user being contemporaneously in use.

36. The meted of claim 29, further comprising the mobile electronic device providing an indication of a location of a selected user based at least in pan on the awareness information.

37. The method of claim 29, further comprising a user identifying the location of another selected user and the additional electronic device based on the awareness information provided to the mobile electronic device.

38. The method of claim 29, wherein the centralized electronic device is at least one of a centralized data processing system and a telephone dialer system.

39. The method of claim 29, wherein the step of updating the central electronic device and the step of receiving awareness information occur during a same communication transaction.

40. The method of claim 29, wherein the step of updating the central electronic device and the step of receiving awareness information comprise the transmission of at least one of data and voice.

41. A system for providing awareness information to one or more users, comprising:
    a central data processing apparatus for managing the awareness information; and
    at least one spatially distributed electronic device in communication with the central data processing apparatus;
    a computer server;
    a telephone dialer server;
    a proxy to the computer server enabling communication with the at least one spatially distributed electronic device;
    wherein the central data processing apparatus receives updates relating to awareness information concerning a status of the at least one spatially distributed electronic device, and the at least one spatially distributed electronic device receives updates relating to additional awareness information relating to one or more selected users.

42. The system of claim 41, wherein the computer server has one or more communication means.

43. The system of claim 42 wherein the one or more communication means comprises at least one of a modem, cable modem, network interface, telephone interface, infrared interface, RF interface, audio interface, visual display, wired connection, and wireless connection.

44. The system of claim 41, wherein the central processing apparatus further comprises a transcoder for translating messages between the proxy and a pager network.

45. The system of claim 41, wherein the at least one spatially distributed electronic device comprises at least one of a computer workstation, notebook computer, personal digital assistant, information appliance, pager, telephone, mobile phone, communication appliance, and data processing device.

46. A computer readable medium storing computer-executable instructions for providing an interface with an electronic device for interacting with at least one source of dynamically changing awareness information, comprising:
    the electronic device communicating with the at least one source to update the at least one source with individual awareness information for the electronic device in communication with the at least one source; and
    the electronic device communicating with the at least one source to receive awareness information relating an additional electronic device;
    wherein the awareness information comprises an indication of time since the electronic device has been in use.

47. A computer readable medium storing computer-executable instructions for initiating a user interacting with a selected user, comprising:
    communicating with the at least one source to receive awareness information relating to the selected user and at least one corresponding selected user device; and
    attempting to initiate a communication with the selected user based at least partially on the awareness information relating to the selected user;
    the at least one corresponding selected user device indicating to the selected user a willingness to communicate of the initiating user.

48. A computer readable medium storing computer-executable instructions for initiating a user interacting with a selected user, comprising:
    communicating with the at least one source to receive awareness information relating to the selected user; and
    attempting to locate the selected user based at least partially on the awareness information relating to the selected user.

* * * * *